(12) United States Patent
Krajnc et al.

(10) Patent No.: US 12,380,780 B2
(45) Date of Patent: *Aug. 5, 2025

(54) SWITCHING BETWEEN SINGLE- AND MULTI-CHANNEL RADIO FREQUENCY BASED SENSING

(71) Applicant: SIGNIFY HOLDING B.V., Eindhoven (NL)

(72) Inventors: Hugo José Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 167 days.

This patent is subject to a terminal disclaimer.

(21) Appl. No.: 18/035,538

(22) PCT Filed: Oct. 29, 2021

(86) PCT No.: PCT/EP2021/080080
§ 371 (c)(1),
(2) Date: May 5, 2023

(87) PCT Pub. No.: WO2022/096381
PCT Pub. Date: May 12, 2022

(65) Prior Publication Data
US 2023/0410618 A1    Dec. 21, 2023

Related U.S. Application Data

(60) Provisional application No. 63/109,974, filed on Nov. 5, 2020.

(30) Foreign Application Priority Data

Nov. 12, 2020  (EP) ..................................... 20207069

(51) Int. Cl.
*G08B 13/187*    (2006.01)

(52) U.S. Cl.
CPC .................................. *G08B 13/187* (2013.01)

(58) Field of Classification Search
CPC ..................................................... G08B 13/187
See application file for complete search history.

(56) References Cited

U.S. PATENT DOCUMENTS 10,004,076 B1    6/2018  Griesdorf et al.
10,743,325 B2 *  8/2020  Xia ................... H04W 72/0453
(Continued)

FOREIGN PATENT DOCUMENTS

CN    108206795 A  *  6/2018  ......... H04L 25/0222
EP      2182754 A1  *  5/2010  ........... H04B 7/0871
(Continued)

OTHER PUBLICATIONS

Kaltiokallio, Ossi, et al., "Enhancing the Accuracy of Radio Tomographic Imaging Using Channel Diversity," IEEE 2012 (9 Pages).
(Continued)

*Primary Examiner* — Chico A Foxx

(57) ABSTRACT

The present invention relates to radio frequency based sensing based on multiple communication technologies (476, 486). Radio frequency based sensing is performed by a single-channel communication technology (476) in order to detect sensing events. A single-channel confidence level (470) for detecting a sensing event by performing radio frequency based sensing by the single-channel communication technology (476) is determined. Upon detecting that the single-channel confidence level (470) is above a first single-channel threshold level (474) and below a second single-channel threshold level (472) which is higher than the first single-channel threshold level (474), a multi-channel communication technology (486) for performing radio frequency based sensing is selected based on one or more radio frequency system criteria, and radio frequency based sens- (Continued)

ing is performed by the multi-channel communication technology (486).

14 Claims, 8 Drawing Sheets

(56) References Cited

U.S. PATENT DOCUMENTS

| | | | | |
|---|---|---|---|---|
| 2003/0100279 | A1* | 5/2003 | Medvid | H03G 3/3052 |
| | | | | 455/164.2 |
| 2004/0240526 | A1* | 12/2004 | Schmandt | H04B 1/715 |
| | | | | 375/135 |
| 2005/0221777 | A1* | 10/2005 | Melly | H04W 52/0245 |
| | | | | 455/233.1 |
| 2011/0148689 | A1 | 6/2011 | Filippi et al. | |
| 2017/0359804 | A1 | 12/2017 | Manku et al. | |
| 2018/0365975 | A1 | 12/2018 | Xu et al. | |
| 2019/0097865 | A1 | 3/2019 | Xu et al. | |
| 2021/0311162 | A1* | 10/2021 | Mai | G01S 7/415 |
| 2022/0286213 | A1 | 9/2022 | Krajnc et al. | |

FOREIGN PATENT DOCUMENTS

| | | | | |
|---|---|---|---|---|
| EP | 2182754 B1 * | 1/2014 | | H04B 7/0871 |
| WO | 2020043592 A1 | 3/2020 | | |

OTHER PUBLICATIONS

Kianoush, Sanaz, et al., "Tracking of Frequency Selectivity for Device-Free Detection of Multiple Targets," ICC2017: WT03-5th IEEE ICC Workshop on Advances in Network Localization and Navigation (ANLN), 2017 (7 Pages).

* cited by examiner

SWITCHING BETWEEN SINGLE- AND MULTI-CHANNEL RADIO FREQUENCY BASED SENSING

CROSS-REFERENCE TO PRIOR APPLICATIONS

This application is the U.S. National Phase application under 35 U.S.C. § 371 of International Application No. PCT/EP2021/080080, filed on Oct. 29, 2021, which claims the benefit of U.S. Provisional Patent Application No. 63/109,974, filed on Nov. 5, 2020 and European Patent Application No. 20207069.4, filed on Nov. 12, 2020. These applications are hereby incorporated by reference herein.

FIELD OF THE INVENTION

The present invention relates to a radio frequency (RF) system for performing RF-based sensing, a method for performing RF-based sensing, and a computer program product for performing RF-based sensing.

BACKGROUND OF THE INVENTION

U.S. Pat. No. 10,004,076 B1 shows selecting a wireless communication channel based on signal quality metrics. A first wireless communication device receives a first set of signals based on wireless signals transmitted through a space on a first wireless communication channel from a second wireless communication device. A signal quality metric value is computed based on the first set of signals and a second wireless communication channel is selected based on a determination that the value of the signal quality metric does not meet a quality criterion for a motion detection process. The first wireless communication device receives a second set of signals based on wireless signals transmitted through the space on the second wireless communication channel from the second wireless communication device and the motion detection process is executed to detect motion of an object in the space based on the second set of signals.

SUMMARY OF THE INVENTION

It can be seen as an object of the present invention to provide an RF system for performing RF-based sensing, a method for performing RF-based sensing, a computer program product for performing RF-based sensing, and a computer readable medium which allow performing RF-based sensing with improved accuracy, reduced energy consumption or both.

In a first aspect of the present invention an RF system for performing RF-based sensing based on multiple communication technologies is presented. The RF system comprises multiple RF devices configured for performing RF-based sensing by a single-channel communication technology in order to detect sensing events. The RF system is configured for determining a single-channel confidence level for detecting a sensing event by performing RF-based sensing by the single-channel communication technology. The RF system is configured upon detecting that the single-channel confidence level is above a first single-channel threshold level and below a second single-channel threshold level which is higher than the first single-channel threshold level to select a multi-channel communication technology for performing RF-based sensing based on one or more RF system criteria and to perform RF-based sensing by the multi-channel communication technology.

Since the RF system is configured upon detecting that the single-channel confidence level is above the first single-channel threshold level and below the second single-channel threshold level to select a multi-channel communication technology for performing RF-based sensing based on the one or more RF system criteria and to perform RF-based sensing by the multi-channel communication technology, required bandwidth, power consumption, wireless interference, and calculation effort during continuously performing RF-based sensing can be lowered in comparison to continuously performing RF-based sensing based on a multi-channel communication technology. Wireless interference may cause ghosting effects, i.e., replica of an RF signal superimposed on the real RF signal with an offset, leading to false positives, i.e., falsely detected sensing events. Wireless interference may also cause RF messages included in the RF signal to be corrupted or missed due to mid-air collisions. Corrupted RF messages may not be used for RF-based sensing such that temporarily less data may be available causing problems for sensing algorithms leading to, e.g., false positives or false negatives. Reducing wireless interference may thus allow improving sensing performance, e.g., by reducing false positives. Furthermore, accuracy can be increased in comparison to continuously performing RF-based sensing by a single-channel communication technology.

The inventors further recognized that simply performing RF-based sensing using two different communication technologies does not necessarily result in a better accuracy, as they are interdependent, i.e., performing RF-based sensing by the multi-channel communication technology may affect both the sensing performance by the single-channel communication technology as well as non-RF-based sensing functions of the single channel communication technology, e.g., data exchange. Therefore, just blindly using rather random or externally defined choices of the communication technologies may not have a superior sensing performance.

Initially performing RF-based sensing by the single-channel communication technology allows determining whether a potential sensing event just may have occurred and to subsequently perform RF-based sensing by the multi-channel communication technology, e.g., using a frequency hopping RF protocol which deliberately scans through multiple frequencies per message, for verifying the sensing event.

As an example, the RF devices of the RF system may be configured for receiving messages over both the single-channel communication technology and the multi-channel communication technology at the same time or use time division multiplexing. As another example the RF devices may be configured to alternate between the single-channel and the multi-channel communication technology based on receiving a signal, such as a signal indicating to switch from single-channel communication to multi-channel technology, which signal can be sent using the single-channel communication technology or out-of-band. The single-channel and multi-channel technology may use the same or similar underlying networking features, such as physical layer and media access control, for example IEEE 802.15.4. Thus, commonly available integrated circuits providing e.g. multiprotocol architecture, shared radio, radio schedulers, that provide, for example, support for both Zigbee and Bluetooth, may be used to implement the RF system.

The RF system may allow leveraging multiple communication technologies for performing RF-based sensing adjusted based on contextual information, e.g., included in the RF system criteria.

The RF system may allow to perform more fine-grained detection of sensing events, to perform classification of the sensing event types, and/or to further increase confidence on the sensing event from coarse RF-based sensing by the single-channel communication technology.

The multiple RF devices may be distributed in a space in which the RF system is arranged. The space may be, for example, a building or a parking lot. The RF devices performing RF-based sensing may be distributed in a sensing area or respectively sensing volume of the space, i.e., forming a distributed group of RF devices, for performing RF-based sensing in the sensing area. The sensing area may be, for example, a room or floor of the building, or parking space of the parking lot. The sensing area may be predefined or may be defined based on the position of the RF devices which perform RF-based sensing.

Different sensing events may be detected by performing RF-based sensing, including, for example, occupancy detection, motion detection, gesture detection, breathing rate detection, and heartbeat rate detection.

The confidence level corresponds to a probability, e.g., indicated by a probability score, that the sensing event is correctly detected. The confidence level may be determined, for example, based on calibration data. Considering the confidence level allows to determine whether a sensing event may be considered as detected, whether a sensing event may be considered as not detected, or whether there is a need for further details, e.g., by switching to the multi-channel communication technology for increasing accuracy.

The RF system may be configured for performing a calibration for the sensing events, e.g., each of the sensing events to be detected by performing RF-based sensing. Detecting a certain event may indicate, for example, whether or not further events are to be expected to follow the event and which together form a sensing event. Alternatively, detecting a certain sensing event may indicate whether or not further sensing events are to be expected to follow the sensing event.

The RF system may be calibrated, for example, for detecting a sensing event in form of a motion detection sensing event, by performing RF-based sensing while a person enters a sensing area in which the RF-based sensing is performed by the RF system, i.e., a user may indicate that results, e.g., sensing metrics, obtained by performing RF-based sensing in the sensing area at that time correspond to the motion detection sensing event. The calibration allows providing RF-based sensing metrics as a ground truth. Alternatively, the RF system may be calibrated by performing RF-based sensing for a number of identical or similar sensing events, e.g., motion detection of different persons, in order to provide a ground truth, e.g., based on average RF-based sensing metrics. Sensing events in form of any subsequent person entering the sensing area may then be compared in terms of those same sensing metrics with respect to the ground truth. If, for example, a person enters the sensing area but walks a different path within the sensing area, RF signals and corresponding RF-based sensing metrics may not look identical to the ground truth, e.g., amplitude or frequency of variations may be similar in shape but not in intensity, or the like. This allows recognizing similar patterns of a known sensing event, which does not need to have the identical pattern.

The RF system may also be calibrated, for example, for detecting a sensing event in form of breathing detection. For breathing detection RF-based sensing is performed in the sensing area in which roughly periodical minor motions of a chest of a person moving up and down are obtained. If the RF system detects such a pattern which corresponds to the chest moving up and down which includes a frequent interruption between up and down it may detect a breathing detection sensing event with some confidence level. However, the single-channel confidence level may be too low to detect the sensing event with confidence. The RF system may then perform RF-based sensing by the multi-channel communication technology, i.e., with higher accuracy, in order to detect the breathing detection sensing event with confidence.

The RF system may also be calibrated for detecting any other type of sensing event, including heartbeat detection, occupancy detection, or the like. During calibration of the RF system the person may be asked to perform certain typical activities, e.g. sitting down or getting up or typing on a computer, in the sensing area while the RF system performs RF-based based sensing for calibrating corresponding sensing events. The obtained data may be used as training data. The data may be labeled by a user or methods known in the prior art for labeling training data may be used for labeling the data.

The RF system may perform RF-based sensing by the single-channel communication technology using one or more, e.g., all, of the multiple RF devices. The RF system may be configured for determining which of the multiple RF devices are most suited for performing RF-based sensing by the single-channel communication technology. The RF system may also be configured for performing RF-based sensing by the single-channel communication technology by a first group of the multiple RF devices and for performing RF-based sensing by the multi-channel communication technology by a second group of the multiple RF devices. The RF system may be configured for determining which of the multiple RF devices are most suited for performing RF-based sensing by the multi-channel communication technology. The RF system may be configured for including the RF devices most suited for performing RF-based sensing by the single-channel communication technology in the first group and/or for including the RF devices most suited for performing RF-based sensing by the multi-channel communication technology in the second group. This may allow improving sensing performance.

The RF system may be configured for selecting the multi-channel communication technology such that the RF based sensing is performed based on a coordinated frequency hopping between multiple frequency channels of the multi-channel communication technology. The coordinated frequency hopping may depend on the one or more RF system criteria. Alternatively, or additionally, the coordinated frequency hopping may depend on the single-channel communication technology used for detecting the sensing event.

A communication technology is defined by a setting of communication technology parameters including a communication protocol, one or more frequency channels, a frequency channel bandwidth of the respective frequency channel, a number of streams, a stream data rate, and a modulation. Changing the setting by changing one of the communication technology parameters typically changes the communication technology. Each of the frequency channels has a center frequency and a frequency channel bandwidth. The frequency channels may have partially overlapping frequencies. Hopping through different frequency channels of a set of frequency channels can be performed for minimizing interference of RF signals, for example, in case a multi-channel communication technology is used for performing RF-based sensing such as a Bluetooth communication protocol, e.g., Bluetooth low energy (BLE). Changing a frequency channel to another frequency channel of the set of frequency channels of the communication technology does not change the communication technology if the communication technology is defined by the set of frequency channels. Changing a frequency channel of the communication technology to another frequency channel changes the communication technology if the communication technology is defined by only one frequency channel.

The communication technology parameters can additionally include one or more of a demodulation and a directionality. For example, a certain modulation can be demodulated in different ways by two or more different demodulations, such as for example to balance a demodulation speed and a demodulation error rate. Directionality can, for example, include omnidirectional and directional transmission. Omnidirectional transmissions can, for example, allow a volumetric view of the sensing volume, while directional transmissions can, for example, allow a narrow beam, e.g. for scanning like a laser scanner or for having a fixed directionality.

The communication protocol included in the communication technology parameters for a certain communication technology can include a cellular radio communication protocol, Zigbee, Bluetooth, BLE, Thread, a WiFi communication protocol, or any other wireless communication protocol. In other words, the communication technologies may include communication protocols such as a cellular radio communication protocol, Zigbee, WiFi, BLE, Thread, or any other wireless communication protocol. Cellular radio communication protocols may, for example, include 5G, 4G, 3G, or any other cellular radio communication protocol. WiFi communication protocols may include protocols of the IEEE 802.11 family, such as IEEE 802.11ax and IEEE 802.11ay.

The frequency channels included in the communication technology parameter can for example include frequency values in the GHz range, such as 2.4 GHz band, 5 GHz band, and 60 GHz band, including for example different frequency channels in the same band, e.g., 2412 MHz and 2472 MHz in the 2.4 GHz band. The frequency channels may also include frequency values in the frequency bands ranging from 450 MHz to 6 GHz, e.g. for sub-6 GHz 5G or from 24.250 GHz to 52.600 GHz for millimeter-wave 5G.

The number of streams included in the communication technology parameter can for example include one or more streams, such as 2, 3, or 4 streams. The maximal number of streams can, for example, depend on the number of multiple input multiple output (MIMO) channels.

The modulation included in the communication technology parameter can for example include orthogonal frequency-division multiplexing (OFDM), direct-sequence spread spectrum (DSSS), frequency-hopping spread spectrum (FHSS), on-off keying (OOK), binary phase shift keying (BPSK), quadrature phase shift keying (QPSK), quadrature amplitude modulation (QAM), or any other modulation.

Values of the communication technology parameters can also be included and selected from standards, such as standards for communication protocols published by the IEEE, such as IEEE 802.15.4, IEEE 802.11ax, IEEE 802.11ay, or any other communication protocol.

A single-channel communication technology is a communication technology which transmits an RF message using a single frequency channel, i.e., the single-channel communication technology uses a single frequency channel with a certain center frequency and frequency channel bandwidth for transmitting the RF message. The single frequency channel can include a frequency range defined by the center frequency and the frequency channel bandwidth, i.e., the single frequency channel is not limited to its center frequency, but can also, for example, include neighboring frequencies in dependence of the frequency channel bandwidth. Furthermore, sideband emissions, i.e., out-of-band emissions, may occur outside of the standardized frequency band defined by the center frequency and frequency channel bandwidth. The single channel-communication technology may use a communication protocol which may in general allow performing RF-based sensing by using multiple frequency channels, which communication protocol, however, in this case is limited to using only one single frequency channel for transmitting the RF message. The single-channel communication technology may include, for example, Zigbee or a WiFi communication protocol. The single-channel communication technology may also include a single-channel communication protocol, i.e., a communication protocol which can perform RF-based sensing only by using a single frequency channel for transmitting the RF message. Using a single-channel communication technology for performing RF-based sensing may allow lowering calculation effort and complexity of RF-based sensing while a sensing event can at least be coarsely detected.

A multi-channel communication technology is a communication technology which hops through multiple frequency channels during the transmission of an RF message. Alternatively, or additionally, the multi-channel communication technology may also use the multiple frequency channels in parallel. The multi-channel communication technology may include a multi-channel communication protocol such as BLE. Each RF message may be chopped into parts and transmitted using different frequency channels of the multi-channel communication technology. For example, BLE can transmit the header of an RF message in the BLE channel 5, then the first half of the payload in channel 9, and the second half in channel 20. Using a multi-channel communication technology for performing RF-based sensing may allow RF-based sensing with higher accuracy as the effects objects and the environment have on the RF signals differ slightly depending on the frequency used.

The same communication protocol may be included in a single-channel communication technology and a multi-channel communication technology. In this case the communication protocol is limited to using only one single frequency channel for transmitting the RF message for the single-channel communication technology while for the multi-channel communication technology multiple frequency channels are used for transmitting the RF message.

RF-based sensing allows for the detection of various events taking place in a space or specific volume. Sensing algorithms may detect and analyze how objects within the space affect RF signals. RF signals are used for transmitting RF messages. RF-based sensing may be used as means for detecting and classifying user activity in homes, offices, etc. For example, based on Zigbee messages being transmitted and received by RF devices in form of smart lights, RF-based sensing may determine motion in a room and turn lights on or off automatically, RF devices in form of WiFi routers may estimate breathing rate of people, etc.

The underlying principle for RF-based sensing is that distortions of RF signals in a space are both a function of the physical elements in it, e.g., moving objects, as well as of the frequency of the RF signals. When RF-based sensing hops through a series of very different frequency bands, e.g., from 2.4 GHz WiFi to 5 GHz WiFi and then to 60 GHz as used by the upcoming WiFi 6 standard, this may yield distinctively different passive sensing results. However, also frequency channels in the same frequency band, e.g., in 2.4 GHz WiFi Channel 1 at 2412 MHz and WiFi Channel 13 at 2472 MHz, will influence the RF-based sensing results.

RF-based sensing can be performed in the RF system by transmitting RF signals from one RF device to another RF device and analyzing the received RF signals. If the RF signals interact with one or more objects on their way between the RF devices, the RF signals are disturbed, such as scattered, absorbed, reflected, or any combination thereof. These disturbances can be analyzed and used for performing RF-based sensing.

Alternatively, a single RF device may perform RF-based sensing by transmitting RF signals into a specific volume, receiving reflected RF signals from the specific volume, and analyzing the reflected RF signals. For example, one antenna of an antenna array of the RF device can transmit the RF signals and another antenna of the antenna array of the same RF device can receive the reflected RF signals, which allows analyzing the reflected RF signals in the same RF device that transmitted the RF signals. RF-based sensing can also be performed in this manner by multiple RF devices of the RF system.

Alternatively, or additionally, one RF device can transmit RF signals into a specific volume and the reflected RF signals can be received and analyzed by another RF device of the RF system for performing RF-based sensing.

The disturbed and/or reflected RF signals can include an RF-based sensing fingerprint based on signal parameters, such as real and imaginary part of electrical permittivity and magnetic susceptibility. Different communication technologies have different absorption and reflection characteristics resulting in different RF-based sensing fingerprints. Using different communication technologies can allow to optimize the performance of the RF-based sensing, as the multi-channel communication technology optimal for a current sensing application with a current sensing quality requirement in a current context, e.g., environment, and considering the available system resources can be selected based on the coarsely performed RF-based sensing based on the single-channel communication technology.

The RF system may perform RF-based sensing by the multi-channel communication technology in order to verify the sensing event potentially detected by the single-channel communication technology. The RF system may also perform RF-based sensing by the multi-channel communication technology for detecting another sensing event, e.g., related to the sensing event potentially detected by performing RF-based sensing by the single-channel communication technology. The sensing event to be detected by the single-channel communication technology and the sensing event to be detected by the multi-channel communication technology do not need to be identical. For example, a gesture made by a user may be detected by performing RF-based sensing by the single-channel communication technology and performing RF-based sensing by the multi-channel communication technology may allow to detect which specific gesture command the user performs, e.g., for controlling the RF system. This may allow performing fine-grained detection of sensing events, performing improved classification of sensing events, and/or increasing confidence in detected sensing events. Furthermore, depending on contextual needs, RF-based sensing based on the multi-channel communication technology may complement the RF-based sensing using the single-channel communication technology in order to provide additional information on the sensing event. RF-based sensing based on the multi-channel communication technology may also confirm the sensing event detected by RF-based sensing by the single-channel communication technology.

The RF system may be configured for performing the RF-based sensing by the single-channel communication technology in dependence of a setting of communication technology parameters of the single-channel communication technology that is optimized for detecting the sensing event. The RF system may be configured for determining and selecting a multi-channel communication technology that optimizes RF based sensing in dependence of the setting of the communication technology parameters of the single-channel communication technology.

The RF system may be configured for performing passive RF-based sensing. Passive RF-based sensing means that for performing RF-based sensing, a transmitting RF device transmits an RF message and a receiving RF device, which is a different RF device than the transmitting RF device, receives the RF message.

The RF system may be configured for performing RF-based sensing by the single-channel communication technology continuously or stopping RF-based sensing by the single-channel communication technology for certain periods. The RF system may be configured, for example, to perform RF-based sensing by the single-channel communication technology continuously, i.e., also in parallel to performing RF-based sensing based on the multi-channel communication technology. The RF system may also stop performing RF-based sensing by the single-channel communication technology for certain periods, e.g., when another function is performed by the RF system, such as providing lighting or when performing RF-based sensing by a multi-channel communication technology.

The RF system may be configured to additionally select a subset of RF devices of the multiple RF devices for performing RF-based sensing based on the one or more RF system criteria upon detecting that the single-channel confidence level is above the first single-channel threshold level and below the second single-channel threshold level, and to perform the RF-based sensing by the multi-channel communication technology using the subset of RF devices. This allows to improve sensing performance, as the distributed nature of the RF-based sensing allows a hybrid cascading in which not only the communication technology is adapted, but also the RF devices performing RF-based sensing by the adapted communication technology. Furthermore, both communication technologies may be used in alternating fashion or in parallel for performing RF-based sensing and/or data exchange, such as data communication. The RF system may be configured, for example, for selecting another subset of RF devices of the multiple RF devices for continuing to perform RF-based sensing by the single-channel communication technology based on the one or more RF system criteria upon detecting that the single-channel confidence level is above the first single-channel threshold level and below the second single-channel threshold level.

The subset of RF devices may form, for example, the second group for performing RF-based sensing by the multi-channel communication technology and the additional subset may form, for example, the first group for performing RF-based sensing by the single-channel communication technology.

The RF system may be configured for stopping RF-based sensing performed by RF devices that are not included in the subset of the RF devices upon detecting that the single-channel confidence level is above the first single-channel threshold level and below the second single-channel threshold level. The RF system may be configured for performing another function, e.g., data exchange, by the RF devices not included in the subset of RF devices which perform RF-based sensing by the multi-channel communication technology. This may allow maintaining a connectivity infrastructure among the RF devices, e.g., Zigbee meshing, or communicating data, e.g., for a WiFi range extender.

Alternatively, or additionally, the RF system may be configured for alternating the functions of the RF devices such that the subset of RF devices performs RF-based sensing by the multi-channel communication technology in a first time period and another subset of RF devices performs another function, e.g. data exchange, in the first time period and such that the other subset of RF devices or yet another subset of RF devices performs RF-based sensing by the multi-channel communication technology in a second time period and the subset or yet another subset performs the other function, e.g. data exchange, in the second time period.

The RF system may be configured for performing RF-based sensing by the single-channel communication technology using the subset of the RF devices
  upon detecting the sensing event, or
  after a predetermined duration has passed since detecting that the single-channel confidence level is above the first single-channel threshold level and below the second single-channel threshold level, or
  upon detecting an end of the sensing event.

The sensing event may be detected, for example, by performing RF-based sensing by the multi-channel communication technology. The end of the sensing event may be detected, for example, by performing RF-based sensing by the multi-channel communication technology. The end of the sensing event may be detected, for example, if a confidence level falls for a certain amount in a certain time period or if the confidence level falls below a first threshold level. This allows to ensure that the RF system reduces power consumption as the single-channel communication technology is mainly used for monitoring the sensing area, e.g., after an event is detected or no event is to be detected at the moment.

The RF system may also be configured for performing RF-based sensing concurrently by the single-channel communication technology and the multi-channel communication technology. This may allow ensuring continuity for the sensing of the sensing event, e.g., not having data gaps or ensuring that a baseline for the single-channel communication technology is up to date. Both communication technologies used concurrently may perform RF-based sensing in an alternating fashion, e.g., in alternating time periods, or with different settings of the communication technology parameters of the different communication technologies such that wireless interference is avoided or at least reduced. This may allow an improved sensing performance, e.g., when the same sensing event is detected by both communication technologies concurrently, the confidence for the detection is superior. Concurrently combining the communication technologies may, for example, allow to detect movement of a hand by the single-channel communication technology while movement of fingers of the hand are detected by the multi-channel communication technology, such that more complex gestures may be detected or gestures may be detected with increased confidence.

The RF system may be configured for determining a multi-channel confidence level for detecting the sensing event by performing RF based sensing by the multi-channel communication technology. Additionally, the RF system may be configured for defining that the sensing event is detected
  if the multi-channel confidence level is above the single-channel confidence level, or
  if the multi-channel confidence level is above a multi-channel threshold level, or
  if a combined confidence level is above a combined threshold level, wherein the combined confidence level and/or the combined threshold level depend on the single-channel confidence level and the multi-channel confidence level. This may allow selecting the multi-channel communication technology for verifying the sensing event or complementing the detection result obtained by performing RF-based sensing by the single-channel communication technology. For example, the multi-channel communication technology may be selected in order to provide additional information. The single-channel communication technology may, for example, detect presence of a user and the multi-channel communication technology may subsequently be used for recognizing an activity of the user, e.g., a gesture.

The first single-channel threshold level may have the same or a different threshold level for the confidence level than a first multi-channel threshold level. The multi-channel threshold level may have the same or a different threshold level for the confidence level than the second single-channel threshold level. The combined threshold level may have the same or a different threshold level for the confidence level than the second single-channel threshold level and/or the multi-channel threshold level. The second single-channel threshold level and/or the multi-channel threshold level may, for example, be equal to or above 50%, 60%, 70%, 80%, or 90%.

The RF system may be configured upon detecting the sensing event to select one or more, e.g., all, RF devices of the subset of the RF devices for performing RF-based sensing by the single-channel communication technology based on the multi-channel confidence level and to perform RF-based sensing by the single-channel communication technology using the selected one or more RF devices of the subset of the RF devices. This allows reducing power consumption and wireless interference as less or none of the RF devices perform RF-based sensing by the multi-channel communication technology while the multi-channel confidence level determined by performing RF-based sensing by the multi-channel communication technology by the remaining RF devices of the subset may be sufficient for detecting when the sensing event ends.

Alternatively, or additionally, the RF system may be configured upon detecting the sensing event to select an additional subset of the RF devices of the multiple RF devices for performing RF-based sensing by the multi-channel communication technology based on results of the sensing event, and to perform RF-based sensing by the multi-channel communication technology using the additional subset of the RF devices. This allows providing additional information, e.g., for detecting another sensing event, such as a gesture which requires higher accuracy, or for verifying the sensing event with higher confidence. The results of the sensing event may include, for example, the multi-channel confidence level. The results of the sensing event may indicate whether additional information is required for detecting another sensing event or whether a sensing event needs to be verified. The sensing event may be, for example, a breathing detection sensing event for sleep monitoring. In this case, the results of the sensing event may, for example, indicate that two persons are laying in a double bed close to each other. This may require to select the additional subset of RF devices for performing RF-based sensing by the multi-channel communication technology in order to allow to detect the breathing detection sensing event for both persons. In particular, the subset and the additional subset of the RF devices may be selected such that the sensing area is optimally covered for performing RF-based sensing in the sensing area for detecting the breathing detection sensing event for both persons in the double bed. The RF system may also be configured for performing RF-based sensing by the subset of the RF devices in order to detect the breathing detection sensing event for the first person in the double bed and for performing RF-based sensing by the additional subset of RF devices in order to detect the breathing detection sensing event for the second person in the double bed. This may allow an improved breathing detection during sleep monitoring for two persons in a double bed.

The RF system may be configured for defining that the sensing event is detected if the single-channel confidence level is above the second single-channel threshold level. This allows to detect sensing events by performing RF-based sensing by the single-channel communication technology for high single-channel confidence levels, i.e., without performing RF-based sensing by the multi-channel communication technology. Alternatively, or additionally, the RF system may be configured to continue performing RF-based sensing by the single-channel communication technology if the single-channel confidence level is below the first single-channel threshold level. This allows continuously performing RF-based sensing by the single-channel communication technology as long as the confidence that a sensing event may have occurred is very low and not necessary for performing RF-based sensing by the multi-channel communication technology in order to verify a potential detection of the sensing event or obtain additional information, e.g., in order to detect another sensing event subsequent to the sensing event potentially detected by the single-channel communication technology.

The RF system may be configured for defining that the sensing event has ended if the single-channel confidence level is below the first single-channel threshold level and the sensing event has been detected before. The RF system may then perform or continue to perform RF-based sensing by the single-channel communication technology.

The RF system may be configured for combining data obtained by performing RF-based sensing by the multi-channel communication technology with data obtained by performing RF-based sensing by the single-channel communication technology in order to improve the RF-based sensing. The data may be combined in order to improve the RF-based sensing by the single-channel communication technology, the RF-based sensing by the multi-channel communication technology, or both. The data may include results of the sensing, e.g., sensing metrics. This may allow to improve sensing performance. The RF system may use the data obtained by the multi-channel communication technology for enriching, verifying, or extending results obtained by performing RF-based sensing by the single-channel communication technology findings of the RF-based sensing.

The RF system may be configured for using the data obtained by performing RF-based sensing by the multi-channel communication technology to train an analysis algorithm for performing RF-based sensing by the single-channel communication technology in order to improve the RF-based sensing. The data obtained by performing RF-based sensing by the multi-channel communication technology may be used as training data in form of a ground truth of RF-based sensing to train the analysis algorithm, e.g., a machine learning algorithm, used by the single-channel communication technology. This may allow improving the sensing performance of the single-channel communication technology and thus of the RF system.

The RF system criteria may include one or more of:
the single-channel communication technology used for performing RF-based sensing,
a duration for which the multi-channel communication technology is used for performing RF-based sensing after detecting that the single-channel confidence level is above the first single-channel threshold level and below the second single-channel threshold level,
an interleaving capability of the single-channel communication technology with the multi-channel communication technology,
a relative priority of the sensing event,
a desired latency for detecting a sensing event,
types of respective RF devices that perform RF-based sensing or a type of a respective RF device of the RF devices that perform RF-based sensing,
performance capabilities of the respective RF device or the respective RF devices,
an impact of the respective RF device or impacts of the respective RF devices for performing RF-based sensing by the multi-channel communication technology and/or for performing RF-based sensing by the single-channel communication technology,
a sensitivity of the respective RF device or the respective RF devices for detecting the sensing event,
a location of the respective RF device or locations of the respective RF devices,
a sensing application,
a current network load of the RF system,
a current network load of the respective RF device or the respective RF devices,
a free data traffic capacity of the RF system, and
a free data traffic capacity of the respective RF device or free data capacities of the respective RF devices.

The relative priority of the sensing event may determine, for example, how many and/or which of the RF devices are selected for performing RF-based sensing. This may allow to further improve RF-based sensing for sensing events of higher priority compared to sensing events of lower priority. This may allow a prioritization of sensing events and an improved utilization of RF devices by the RF system.

Performance capabilities may include, for example, transmitting capabilities and receiving capabilities of the RF devices. The performance capabilities of the RF devices may be determined, for example, by the components of the RF devices, e.g., a number of antennas available for transmitting and/or receiving, or the like.

The RF system may be configured for determining the free data traffic capacity of the RF system and/or respective RF devices before selecting the multi-channel communication technology for performing RF-based sensing. The RF system may also be configured for determining the free data traffic capacity of the RF system and/or the respective RF devices before selecting the subset of RF devices for performing RF-based sensing. The RF system may be configured for selecting the multi-channel communication technology and/or the subset of RF devices for performing RF-based sensing such that additional data traffic is less than the free data traffic capacity of the RF system and/or the respective RF devices. This allows to ensure that the free data traffic capacity is not exceeded. The RF system may further be configured for determining a current network load of the RF system and/or the RF devices.

The interleaving capability of the single-channel communication technology with the multi-channel communication technology relates to how RF messages used for performing RF-based sensing are alternated among the communication technologies. The RF messages need to be transmitted and received by an RF device performing RF-based sensing by the respective communication technology, e.g., if an RF device transmits a RF message on BLE and another RF device performs RF-based sensing based on Zigbee, the RF message cannot be received by the RF device performing RF-based sensing based on Zigbee and the RF message may be missed. Alternating between the communication technologies used for performing RF-based sensing allows to increase a likelihood of receiving the RF messages for performing RF-based sensing.

Selecting the multi-channel communication technology based on the desired latency for detecting the sensing event allows to increase speed of detecting a sensing event or may even allow to detect certain sensing events. The multi-channel communication technology typically is quicker in discerning a sensing event than the single channel communication technology.

The impact of the respective RF device or impacts of the respective RF devices for performing RF-based sensing may include, for example, a network impact or an impact on power consumption. The network impact may, for example, include a measure or estimate of an amount of missed RF messages.

The location of the respective RF device or the locations of the respective RF devices may be absolute locations or relative locations, e.g., to other RF devices.

The threshold levels may depend on one or more contextual parameters including one or more of:
  a type of a sensing area in which RF-based sensing is performed,
  a type or types of the RF devices performing RF-based sensing,
  capabilities of the RF devices performing RF-based sensing,
  a number of RF devices performing RF-based sensing,
  an amount of traffic generated for performing RF-based sensing,
  a power consumption for performing RF-based sensing,
  a date,
  a sensing application,
  a type or types of users in the sensing area,
  a number of users in the sensing area,
  characteristics of a space in which the RF system is arranged,
  a type or types of users in the space,
  a number of users in the space,
  a type or types of sensing events,
  one or more expected sensing events,
  cascades of sensing events, and
  contextual information from external systems.

The threshold levels may include the single-channel threshold levels, the multi-channel threshold levels, and/or the combined threshold level.

A type of the sensing area in which radio RF-based sensing is performed may include, for example, a type of a room, such as a small hallway compared to a large living room. Alternatively, or additionally, the type of the sensing area may include, for example, characteristics of the room, e.g., materials of the walls, size of the room, or any other characteristic which may influence RF signal propagation. The type of the sensing area, e.g., type of the room, may also relate to a typical use of the sensing area, e.g., a bed room for sleeping or reading in the bed.

The number of RF devices performing RF-based sensing may influence accuracy of RF-based sensing and wireless interference. Typically more RF devices allow a higher accuracy while also increasing risk of wireless interference.

The amount of traffic generated for performing RF-based sensing may depend, for example on a sampling rate of the sensing event. Having less traffic reduces wireless interference while also reducing accuracy of the detection. This may also influence the confidence in the detection and may affect the threshold levels in order to, e.g., have sufficient confidence in the detection of a sensing event. The amount of traffic may include an amount of traffic of one or more respective devices. For example, different RF devices may generate different amount of traffic, e.g., as different RF devices may have different transmitting and receiving capabilities. The threshold levels may depend on the amount of traffic generated for performing RF-based sensing by one or more respective RF devices.

The power consumption for performing RF-based sensing depends on the communication technology for performing RF-based sensing. Multi-channel communication technologies typically may consume more power than single-channel communication technologies for performing RF-based sensing in case that additional processing is required. For example, particularly in case of RF systems in case of connected lighting systems, including RF devices in form of lights, more data processing needs to be performed for performing RF-based sensing by the multi-channel communication technologies, e.g., by the sensing algorithm, than for performing RF-based sensing by single-channel communication technologies. The power consumption for performing RF-based sensing may also depend on the RF device that performs RF-based sensing. The threshold levels may depend on the power consumption for performing RF-based sensing of one or more respective RF devices.

A date may include a time of the day and/or a day of the week. This may influence importance of the detection. For example, during typical working hours when the user is not a home and movement is detected in the sensing area, this may indicate burglary and the threshold level may be set lower in order to ensure detection.

The sensing application may be, for example, gesture detection. Performing gesture detection may be interesting, for example, for performing gesture control of the RF system, but not critical for security monitoring, e.g., in order to detect burglary. This allows adapting threshold levels in order to balance between a detection speed and false positive detection, such as a time until the sensing event is detected can be optimized while false positives are not excessive. Furthermore, threshold levels may be adapted in order to balance between accuracy and false negative detection, e.g., missing a few seconds of breathing information may not be as critical as missing detecting that a burglar did enter your kids room or not.

Expected sensing events may be, e.g. based on the known daily routine of the user, e.g., an elderly person in the home. For instance after watching the 8 pm news, the user typically goes to the bathroom and brushes teeth. Therefore, for example, fall detection may be performed in the bathroom. Expected sensing events may in combination of a type of the sensing area in which radio RF-based sensing is performed, for example, include adjusting the threshold levels for certain sensing events if the RF-based sensing is performed in a bedroom, e.g., the threshold levels for reading or sleeping may be lowered while they are increased for taking a bath or the like.

Contextual information from external systems may include, for example, position information, e.g., geofencing information provided from a user's smartphone. The geofencing information may be used to determine whether the user is nearby the RF system and detecting a sensing event related to the user is likely.

The RF system may be configured for alternating between performing RF-based sensing by the single-channel communication technology and the multi-channel communication technology based on the single-channel confidence level and/or the multi-channel confidence level. For example, the RF system may be configured for performing RF-based sensing by the multi-channel communication technology when the single-channel confidence level is above the first single-channel threshold level and for performing again RF-based sensing by the single-channel communication technology when the sensing event is defined as detected, e.g., when the multi-channel confidence level is above the multi-channel threshold level. This allows switching, respectively alternating, between single-channel communication technology and multi-channel communication technology during longer periods of time in order to improve RF-based sensing accuracy while keeping power consumption as low as possible. The RF system may be configured for performing RF-based sensing again by the single-channel communication technology, for example, when at least one feature of the sensing event is extracted by performing RF-based sensing by the multi-channel communication technology. Features of the sensing event may include or be metadata about the sensing event. For example, features of the sensing event in form of gesture recognition, such as hand waving, may include frequency of the waving, which hand, e.g., left or right, is waved, whether the fingers are in a specific position relative to the palm, or the like. This may allow triggering a switching between the multi-channel communication technology and the single-channel communication technology.

The RF system may be configured for exchanging data based on the multi-channel communication technology and/or the single-channel communication technology.

In a further aspect of the present invention a method for performing RF-based sensing based on multiple communication technologies is presented. The method comprises the steps:
performing RF-based sensing by a single-channel communication technology in order to detect sensing events using one or more RF devices of multiple RF devices of a RF system,
determining a single-channel confidence level for detecting a sensing event by performing RF-based sensing by the single-channel communication technology, and
upon detecting that the single-channel confidence level is above a first single-channel threshold level and below a second single-channel threshold level which is higher than the first single-channel threshold level
selecting a multi-channel communication technology for performing RF-based sensing based on one or more RF system criteria, and
performing RF-based sensing by the multi-channel communication technology.

The method may comprise one or more of the steps:
upon detecting that the single-channel confidence level is above the first single-channel threshold level and below the second single-channel threshold level, additionally selecting a subset of RF devices of the multiple RF devices for performing RF-based sensing based on the one or more RF system criteria,
performing the RF-based sensing by the multi-channel communication technology using the subset of RF devices,
stopping RF-based sensing performed by RF devices that are not included in the subset of the RF devices upon detecting that the single-channel confidence level is above the first single-channel threshold level and below the second single-channel threshold level,
performing RF-based sensing by the single-channel communication technology using the subset of the RF devices upon detecting the sensing event,
performing RF-based sensing by the single-channel communication technology using the subset of the RF devices after a predetermined duration has passed since detecting that the single-channel confidence level is above the first single-channel threshold level and below the second single-channel threshold level,
performing RF-based sensing by the single-channel communication technology using the subset of the RF devices upon detecting an end of the sensing event,
determining a multi-channel confidence level for detecting the sensing event by performing RF-based sensing by the multi-channel communication technology,
defining that the sensing event is detected if the multi-channel confidence level is above the single-channel confidence level,
defining that the sensing event is detected if the multi-channel confidence level is above a multi-channel threshold level,
defining that the sensing event is detected if a combined confidence level is above a combined threshold level, wherein the combined confidence level and/or the combined threshold level depend on the single-channel confidence level and the multi-channel confidence level,
upon detecting the sensing event, selecting one or more RF devices of the subset of the RF devices for performing RF-based sensing by the single-channel communication technology based on the multi-channel confidence level and performing RF-based sensing by the single-channel communication technology using the selected one or more RF devices of the subset of the RF devices,
upon detecting the sensing event, selecting an additional subset of the RF devices of the multiple RF devices for performing RF-based sensing by the multi-channel communication technology based on results of the sensing event, and performing RF-based sensing by the multi-channel communication technology using the additional subset of the RF devices,
defining that the sensing event is detected if the single-channel confidence level is above the second single-channel threshold level,
continuing to perform RF-based sensing by the single-channel communication technology if the single-channel confidence level is below the first single-channel threshold level,
combining data obtained by performing RF-based sensing by the multi-channel communication technology with data obtained by performing RF-based sensing by the single-channel communication technology in order to improve the RF-based sensing, and using the data obtained by performing RF-based sensing by the multi-channel communication technology to train an analysis algorithm for performing RF-based sensing by the single-channel communication technology in order to improve the RF-based sensing.

The method may include the step:

performing the RF-based sensing by the single-channel communication technology in dependence of a setting of communication technology parameters of the single-channel communication technology that is optimized for detecting the sensing event.

In a further aspect of the present invention a computer program product for performing RF-based sensing based on multiple communication technologies is presented. The computer program product comprises program code means for causing a processor to carry out the method according to claim 12 or 13, or any embodiment of the method, when the computer program product is run on the processor.

In a further aspect a computer readable medium having stored the computer program product of claim 14 is presented. Alternatively, or additionally, the computer readable medium may have the computer program product according to any embodiment of the computer program product stored.

It shall be understood that the RF system of claim 1, the method of claim 12, the computer program product of claim 14, and the computer readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
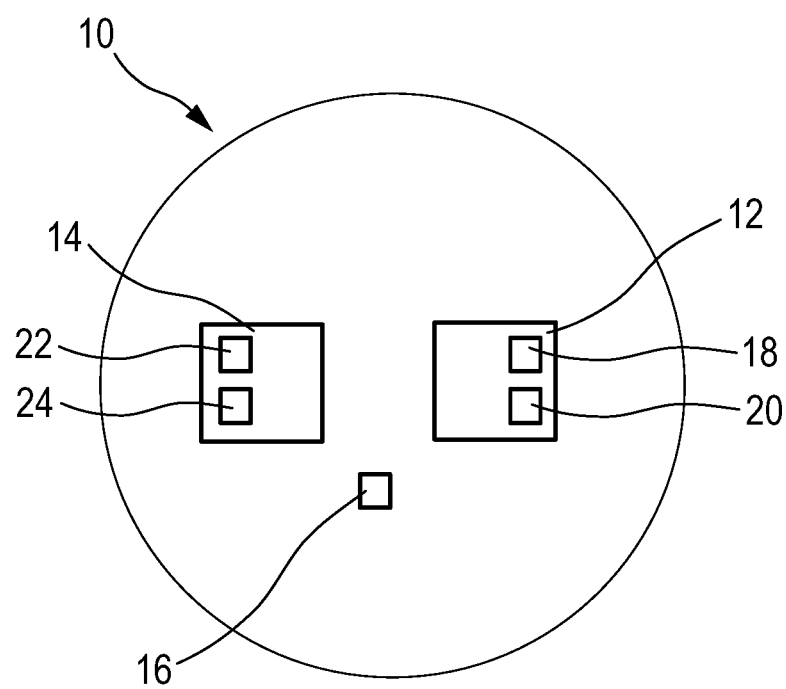
FIG. 1 shows schematically and exemplarily an RF device for an RF system.
Figure 2:
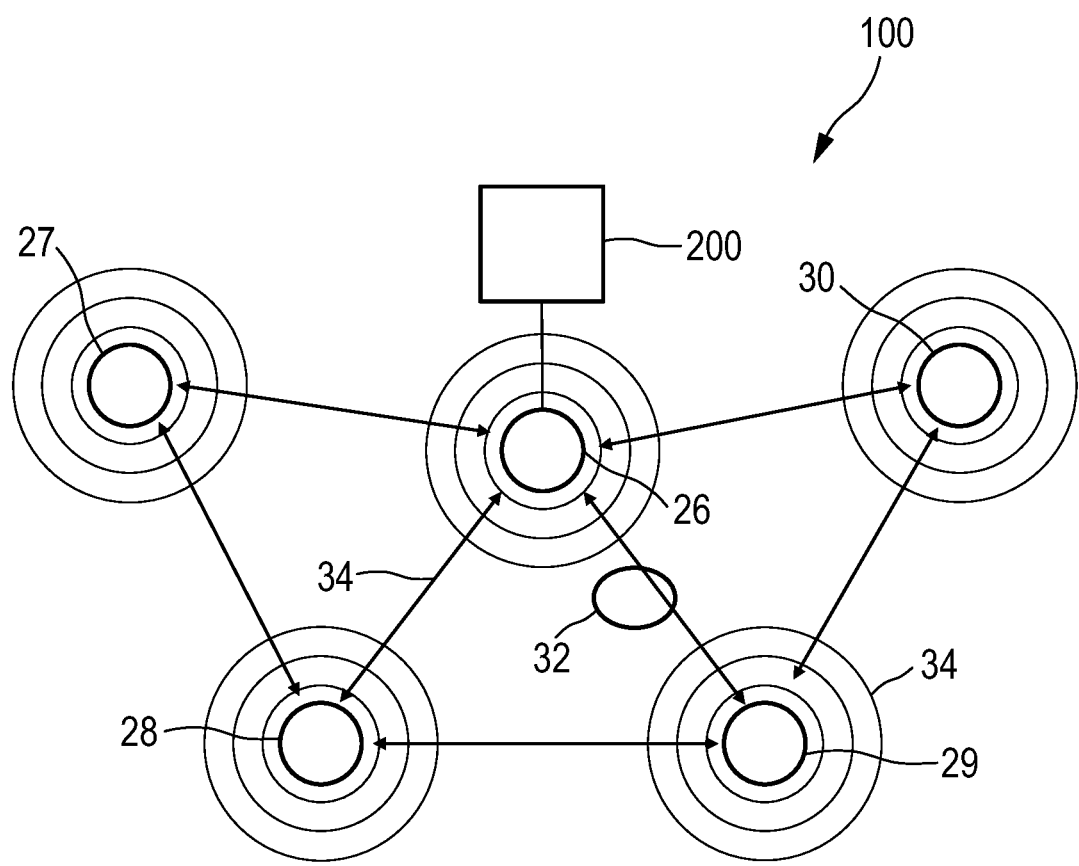
FIG. 2 shows schematically and exemplarily an embodiment of an RF system.
Figure 3:
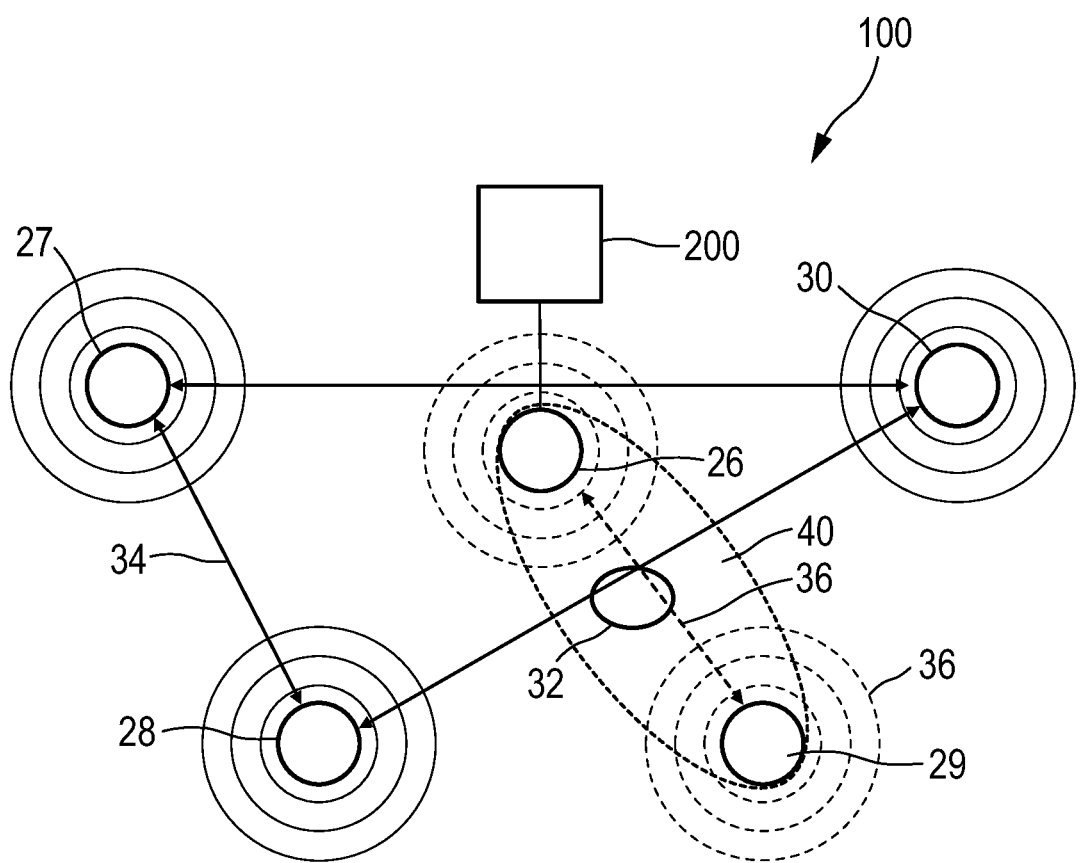
FIG. 3 shows schematically and exemplarily the embodiment of the RF system after a single-channel confidence level above a first single-channel threshold level has been detected.

FIG. 1 shows schematically and exemplarily an RF device 10 for an RF system including multiple RF devices, e.g., connected lighting (CL) system 100 shown in FIG. 2 and FIG. 3.

The CL system 100 as shown in FIG. 2 and FIG. 3 includes RF devices 26, 27, 28, 29, and 30 and is connected with an external server 200 via the RF device 26. In other embodiments the RF system may also include a different number of RF devices, e.g., two, four or more. The RF devices may, for example, be routers, bridges, lights, luminaires, switches, or sensors. RF device 26 is a bridge in this embodiment and the other RF devices 27 to 30 are luminaires for providing light. The server 200 is a server of a building management system (BMS) and serves for controlling lighting functions of the CL system 100. Besides performing these functions, the RF devices 26 to 30 additionally are configured for performing RF-based sensing based on multiple communication technologies. This allows using the wireless infrastructure of the CL system 100 to perform RF-based sensing, increasing the functionality of the CL system 100. RF-based sensing can, for example, be used for motion detection, presence detection, people counting, breathing rate measurements, heart rate measurements, shape detection, gesture detection, fall detection, or for performing other sensing applications.

Due to power consumption limitations, synchronization of messages, clogging of wireless spectrum, or the like, for many sensing applications, it is advantageous to at first perform RF-based sensing by a single-channel communication technology, e.g., Zigbee 34, even if the RF devices performing RF-based sensing are capable of performing RF-based sensing by multi-channel communication technology, e.g., BLE 36. This may allow a coordinated cascading from performing RF-based sensing by a single-channel communication technology with a certain set of RF devices of the RF system to performing RF-based sensing by a multi-channel communication technology with a certain set of RF devices.

The CL system 100 can be used for determining when to switch between the multiple different communication technologies based on various RF system criteria, as well as how to perform RF-based sensing with the different communication technologies and how to determine an optimized configuration of the communication technologies and possibly different sets of RF devices for performing RF-based sensing by a certain communication technology such that they improve RF-based sensing.

In the following we first describe details for exemplary RF device 10 that may be used in the CL system 100.

The RF device 10 comprises a control unit 12, a transceiver unit 14, and an antenna array 16. Instead of an antenna array, a single antenna may also be included in the RF device.

The control unit 12 includes a processor 18 and a computer readable medium in form of memory 20.

In this embodiment, the transceiver unit 14 includes a single-channel communication technology transceiver in form of a Zigbee transceiver 22 and a multi-channel communication technology transceiver in form of a BLE transceiver 24. The Zigbee transceiver 22 uses a specific Zigbee communication technology in this embodiment. The Zigbee communication technology may, for example, use values of the communication technology parameters of one of the alternatives as defined by the IEEE 802.15.4 communication protocol and/or the Zigbee standard. The BLE transceiver 24 uses BLE communication technology. In this embodiment, the BLE transceiver 24 can be operated with multiple different frequency channels, e.g., performing frequency hopping between the different frequency channels while transmitting an RF message. In other embodiments, the transceiver unit may be configured for using various other communication technologies, such as WiFi, cellular radio, Thread, or any other communication technology. In this embodiment, the transceiver unit 14 transmits and receives RF signals using only one of the communication technologies at a time. In other embodiments, the transceiver unit may be configured for transmitting and receiving RF signals using more than one communication technology.

The transceiver unit 14 uses the antenna array 16 for transmitting RF signals to RF devices and receiving RF signals from RF devices of the CL system 100 for exchanging data including RF messages wirelessly between the RF devices and for performing RF-based sensing. This allows the RF device 10 to exchange data based on the multi-channel communication technology, i.e. BLE 36, and/or based on the single-channel communication technology, i.e., Zigbee 34. For performing RF-based sensing, RF signals transmitted from one RF device to another RF device are disturbed by objects such as user 32 within a specific volume between the RF devices. The RF signals disturbed by an object in the specific volume can be analyzed in the control unit 12. The RF signals can use the Zigbee 34 communication technology or the BLE 36 communication technology. In other embodiments, the transceivers of the transceiver unit can be used for performing RF-based sensing by transmitting RF signals into a specific volume and by receiving and analyzing reflected RF signals from the specific volume by the same RF device. The RF signals can also be transmitted into the specific volume by one RF device and disturbed and/or reflected RF signals can be received and analyzed by another RF device.

The memory 20 of the control unit 12 stores a computer program product for performing RF-based sensing based on multiple communication technologies. The computer program product includes program code means for causing processor 18 to carry out a method for performing RF-based sensing based on multiple communication technologies when the computer program product is run on the processor 18, e.g., the method as presented in FIG. 8. The memory 20 further includes a computer program product for operating the RF device 10 and optionally also the CL system 100, e.g., for controlling the functions of the RF device and controlling the functions of the RF devices of the CL system, for example, in order to provide lighting as well as for performing RF-based sensing.

Furthermore, the memory 20 stores settings of communication technology parameters of the communication technologies used for performing RF-based sensing.

In the following the functionality of the CL system 100 for performing RF-based sensing as shown in FIG. 2 and FIG. 3 is explained.

The RF devices 26 to 30 as shown in FIG. 2 perform RF-based sensing by Zigbee 34, i.e., a single-channel communication technology. In other embodiments, only one or some of the RF devices may perform RF-based sensing.

The CL system 100 determines a single-channel confidence level for detecting a sensing event, e.g., a motion, by performing RF-based sensing by Zigbee 34. In this embodiment, the control unit of the RF device 26 determines the single-channel confidence level. The RF devices 26 to 30 continue performing RF-based sensing by Zigbee 34 as long as the single-channel confidence level is below a first single-channel threshold level. This indicates that no sensing event is detected. Furthermore, the control unit defines the sensing event to be detected if the single-channel confidence level is above a second single-channel threshold level which is higher than the first single-channel threshold level.

Upon detecting that the single-channel confidence level is above the first single-channel threshold level and below the second single-channel threshold level, the control unit selects a multi-channel communication technology for performing RF-based sensing based on one or more RF system criteria. The control unit selects the multi-channel communication technology such that the RF-based sensing is performed based on a coordinated frequency hopping between multiple frequency channels of BLE 36 as shown in FIG. 3. The coordinated frequency hopping may in other embodiments depend on the single-channel communication technology. In this embodiment, the multi-channel communication technology is BLE 36. Therefore, the control unit does not need to select a communication protocol based on the one or more RF system criteria in this embodiment, but only a setting of communication technology parameters. In other embodiments, different communication protocols may be available for the multi-channel communication technology and the communication protocol used for performing RF-based sensing may be selected based on the one or more RF system criteria.

The RF system criteria include which single-channel communication technology is used for performing RF-based sensing, a duration for which the multi-channel communication technology is used for performing RF-based sensing after detecting that the single-channel confidence level is above the first single-channel threshold level and below the second single-channel threshold level, an interleaving capability of the single-channel communication technology with the multi-channel communication technology, a relative priority of the sensing event, a desired latency for detecting a sensing event, types of respective RF devices that perform RF-based sensing, performance capabilities of the respective RF devices, impacts of the respective RF devices for performing RF-based sensing by the multi-channel communication technology and/or for performing RF-based sensing by the single-channel communication technology, a sensitivity of the respective RF devices for detecting the sensing event, locations of the respective RF devices, a sensing application, a current network load of the CL system 100, a current network load of the respective RF devices, a free data traffic capacity of the RF system, and free data capacities of the respective RF devices.

In this embodiment, the control unit additionally select a subset 40 of the RF devices for performing RF-based sensing by BLE 36 based on the one or more RF system criteria upon detecting that the single-channel confidence level is above the first single-channel threshold level and below the second single-channel threshold level.

Since performing RF-based sensing by the multi-channel communication technology may negatively influence data exchange, such as providing lighting control commands, between the RF devices 26 to 30 in the CL system 100, the control unit of the RF device 26 may optionally determine a current network load and available free capacity for the data exchange between the RF devices 26 to 30 before selecting the multi-channel communication technology and/or the subset of the RF devices. The control unit of the RF device 26 may optionally select the multi-channel communication technology and the subset of RF devices in such a way that the data traffic generated between the RF devices is lower than the available free capacity for the data exchange. This allows ensuring that the RF-based sensing by the multi-channel communication technology does not negatively impact the performance of the normal functions of the CL system 100, e.g., providing lighting.

In this embodiment, the RF devices 26 and 29 are selected for performing RF-based sensing by BLE 36 while RF devices 27, 28, and 30 keep on performing RF-based sensing by Zigbee 34. In other embodiments, performing RF-based sensing performed by RF devices that are not included in the subset of the RF devices may be stopped upon detecting that the single-channel confidence level is above the first single-channel threshold level and below the second single-channel threshold level.

FIG. 3 shows the subset 40 of RF devices 26 and 29 performing RF-based sensing by BLE 36. In this embodiment, the control unit of RF device 26 determines a multi-channel confidence level for detecting the sensing event by performing RF-based sensing by BLE 36. The multi-channel confidence level may be used in different scenarios of threshold levels for detecting the sensing event.

In the following three different scenarios 410, 420, and 430 of threshold levels for detecting the sensing event are described with respect to FIGS. 4A, 4B, and 4C. According to all three scenarios 410, 420, and 430 threshold levels are provided which divide the confidence levels in three confidence level regions, namely, a certain sensing event region 440, a potential sensing event region 450, and a no sensing event region 460.

The sensing event is defined to be detected, if single-channel confidence level 470 for detecting the sensing event by performing RF-based sensing by a single-channel communication technology 476, e.g., Zigbee 34, is above second single-channel threshold level 472, i.e., it is in the certain sensing event region 440.

If the single-channel confidence level 470 is below first single-channel threshold level 474, i.e., it is in the no sensing event region 460, no sensing event is detected. If no sensing event is detected, the RF devices keep on performing RF-based sensing by the single-channel communication technology 476.

If the single-channel confidence level 470 is above the first single-channel threshold level 474 and below the second single-channel threshold level 472, the single-channel confidence level 470 is within potential sensing event region 450. The potential sensing event region 450 indicates that a sensing event may have been detected but the confidence is not high enough for detecting the sensing event with certainty. In order to detect the sensing event with certainty RF-based sensing by a multi-channel communication technology 486, e.g., BLE 36, is performed in the three scenarios 410, 420, and 430. In this case a multi-channel confidence level 480 for detecting the sensing event by performing RF-based sensing by the multi-channel communication technology is determined.

For all three scenarios 410, 420, and 430, a second multi-channel threshold level 482 has an identical threshold confidence level as the second single-channel threshold level 472 and a first multi-channel threshold level 484 has an identical threshold confidence level as the first single-channel threshold level 474. In other embodiments, the multi-channel threshold levels may also be different to the single-channel threshold levels.

Figure 4A:
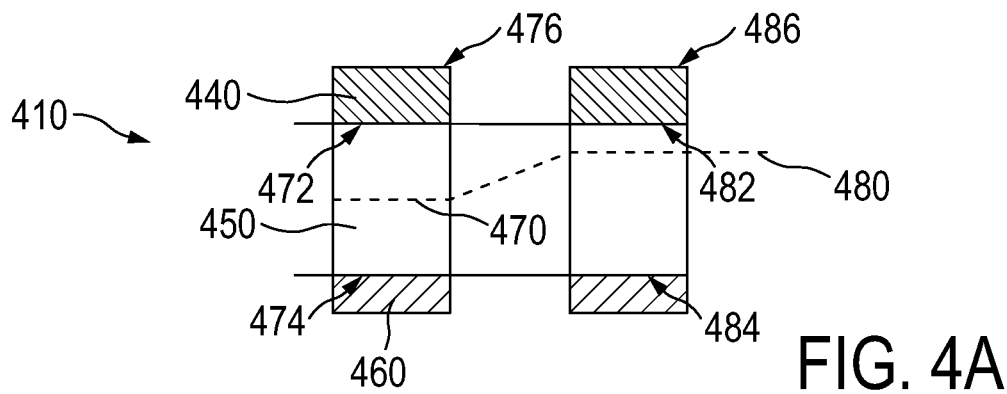
FIG. 4A shows a first scenario of threshold levels for detecting a sensing event.

FIG. 4A shows the first scenario 410 in which the multi-channel confidence level 480 is above the first multi-channel threshold level 484 and below the second multi-channel threshold level 482, i.e., it is in the potential sensing event region 450. In the first scenario 410, the sensing event is defined to be detected if the multi-channel confidence level 480 is above the single-channel confidence level 470.

Figure 4B:
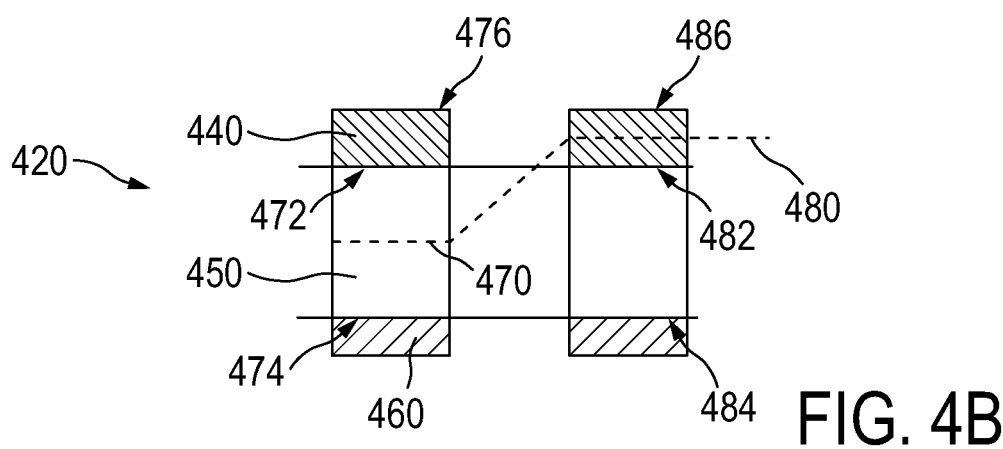
FIG. 4B shows a second scenario of threshold levels for detecting a sensing event.

FIG. 4B shows the second scenario 420. In the second scenario 420, the sensing event is defined to be detected if the multi-channel confidence level 480 is above the second multi-channel threshold level 482.

Figure 4C:
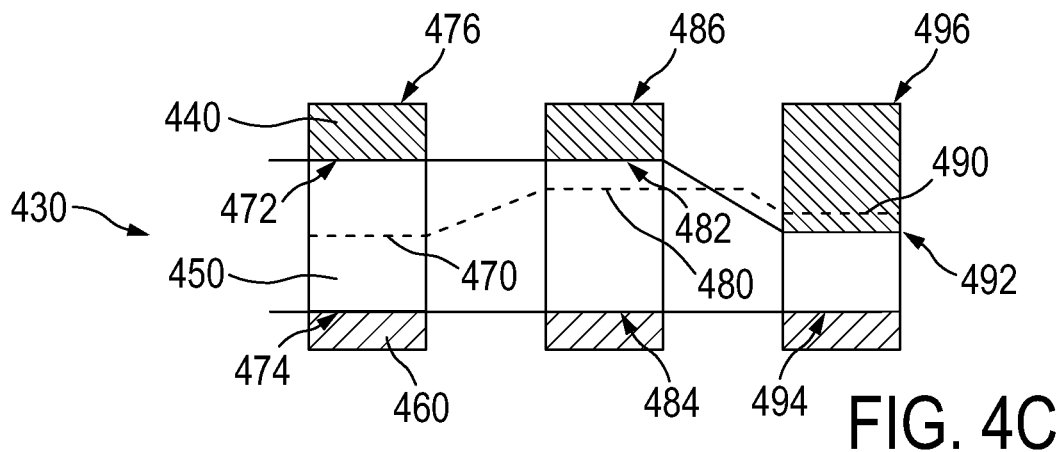
FIG. 4C shows a third scenario of threshold levels for detecting a sensing event.

FIG. 4C shows the third scenario 430. In the third scenario 430, the multi-channel confidence level 480 is in the potential sensing event region 450. In contrast to the first scenario 410, the sensing event is not defined to be detected in this case. Instead a combined confidence level 490 is determined. In this embodiment the combined confidence level 490 is a weighted average of the single-channel confidence level 470 and the multi-channel confidence level 480. Furthermore, first combined threshold level 494 and second combined threshold level 492 are determined. In this embodiment, the first combined threshold level 494 and the second combined threshold level 492 depend on the single-channel confidence level and the multi-channel confidence level. In other embodiments, the combined threshold levels may alternatively or additionally depend on the single-channel threshold levels and/or the multi-channel threshold levels.

In the third scenario 430, the sensing event is defined to be detected if the combined confidence level 490 is above the second combined threshold level 492. If the combined confidence level 490 is within the potential sensing event region 450, RF-based sensing is performed by the multi-channel communication technology 486 and the single-channel communication technology 476 in parallel or by interleaving with the multi-channel communication technology 486. In other embodiments, RF-based sensing may also be performed only by the multi-channel communication technology 486 in this case. If the combined confidence level 490 is in the no sensing event region 460, RF-based sensing is performed by the single-channel communication technology 476.

The threshold levels, i.e., single-channel threshold levels, multi-channel threshold levels, and combined threshold levels, may be different to each other. For example, the first single-channel threshold level may be at 20% and the second single-channel threshold level may be at 80% and the first multi-channel threshold level may be at 18% and the second multi-channel threshold level may be at 73%.

Furthermore, the threshold levels may depend on one or more contextual parameters. The contextual parameters may include one or more of: a type of a sensing area in which RF-based sensing is performed, a type or types of the RF devices performing RF-based sensing, capabilities of the RF devices performing RF-based sensing, a number of RF devices performing RF-based sensing, an amount of traffic generated for performing RF-based sensing, power consumption for performing RF-based sensing, a date, a sensing application, a type or types of users in the sensing area, a number of users in the sensing area, characteristics of a space in which the RF system is arranged, a type or types of users in the space, a number of users in the space, a type or types of sensing events, one or more expected sensing events, cascades of sensing events, and contextual information from external systems.

The sensing area may include a type and/or characteristics of a space, such as a room or a building, in which the RF system is arranged. For example, it may be intrinsically more difficult for detecting the sensing event in a small hallway than in a large living room. The type of the space may also include a floorplan or layout of the space, e.g., a building. The floorplan may include interconnections between rooms. If a smart doorlock arranged at an entrance of the building provides contextual information, e.g., that a user entered the building, threshold levels and/or confidence levels may be adjusted depending on how far away the sensing area is from the smart doorlock as detecting motion by the RF devices in a room adjacent to the smart doorlock is more likely than in a room far away from the smart doorlock.

The types and number of RF devices may influence the threshold levels as in general more RF devices may generate more data, such that the confidence should increase. On the other hand, some RF devices may generate more noisy data samples, such that the confidence may decrease.

The date may include, for example, a time of the day. Implications of missing a sensing event may impact the RF system or its user differently throughout the day.

Furthermore, the sensing application influences the threshold levels as, for example, detecting a gesture may be interesting for light control, but not critical for security monitoring, such that different threshold levels may be balanced out with reaction speed depending on the sensing application, i.e., what sensing event the RF system shall detect.

The type of users present in the sensing area or the space may influence the threshold levels, e.g., for fall detection performed for an elderly person being alone in the home false negatives may be more severe than for a number of kids running around in the home. Therefore, the threshold level for fall detection may be lower for the elderly person than for the kids.

The expected sensing event may, for example, indicate a sensing event expected after a certain sensing event is detected, such as, detecting motion in a certain room, after occupancy of the room has been detected. If, for example, abnormal daily routines of an elderly person are detected, this may indicate a potential issues for the elderly person and warrant a closer supervision by RF-based sensing. For instance, an abnormal daily routine may be that an elderly person is moving slower from one room to another than usual, or stays in her bed instead of watching her favorite TV show in the living room. In this case, the threshold levels may be adjusted in order to lower false negatives.

The contextual information from external systems originates from outside of the RF system. The contextual information may besides adjusting the threshold levels be used for adjusting the confidence levels. This may allow to support the RF system in deciding whether a sensing event is detected or whether to temporarily perform RF-based sensing by the multi-channel communication technology, e.g., using a frequency hopping RF protocol, in order to detect the sensing event with certainty.

The contextual information may include geofencing information, such as whether a user is present in the sensing area. This geofencing information is not provided by the RF-based sensing, but from another source, e.g., the mobile phone of the user. If the user is known to be present in the sensing area, e.g., at home, then the second single-channel threshold level may be lowered. In other embodiments, there may be other devices in or in proximity to the sensing area of the RF system which may provide contextual information, e.g., regarding sensing events that may likely take place within the sensing area.

Upon detecting the sensing event, the CL system 100, in this embodiment, performs RF-based sensing by the single-channel communication technology using the subset 40 of the RF-devices, again, i.e., all RF devices 26 to 30 again, perform RF-based sensing by the single-channel communication technology, after the sensing event has been detected. In other embodiments, the RF system may also be configured for performing RF-based sensing by the single-channel communication technology using the subset of the RF-devices after a predetermined duration has passed since detecting that the single-channel confidence level is above the first single-channel threshold level and below the second single-channel threshold level or upon detecting an end of the sensing event.

In yet other embodiments, the RF system may be configured upon detecting the sensing event to select one or more RF devices of the subset of the RF devices for performing RF-based sensing by the single-channel communication technology based on the multi-channel confidence level and to perform RF-based sensing by the single-channel communication technology using the selected one or more RF devices of the subset of the RF devices, or to select an additional subset of the RF devices of the multiple RF devices for performing RF-based sensing by the multi-channel communication technology based on results of the sensing event, and to perform RF-based sensing by the multi-channel communication technology using the additional subset of the RF devices.

By performing RF-based sensing, data which includes RF signals, as well as disturbed and reflected RF signals, is obtained.

In this embodiment, the control unit of the RF device 26 combines the data obtained by performing RF-based sensing based on the multi-channel communication technology with the data obtained by performing RF-based sensing by the single-channel communication technology in order to improve the RF-based sensing. The combination of the data may be used for confirming initial findings obtained by the single-channel communication technology, e.g., potentially detecting a sensing event. The control unit of the RF device 26 may also use the data obtained by performing RF-based sensing by the multi-channel communication technology to train an analysis algorithm for performing RF-based sensing by the single-channel communication technology in order to improve the RF-based sensing. In particular, the analysis algorithm can learn from detecting sensing events by the multi-channel communication technology which patterns obtained by performing RF-based sensing by the single-channel communication technology indicate a sensing event.

Figure 5:
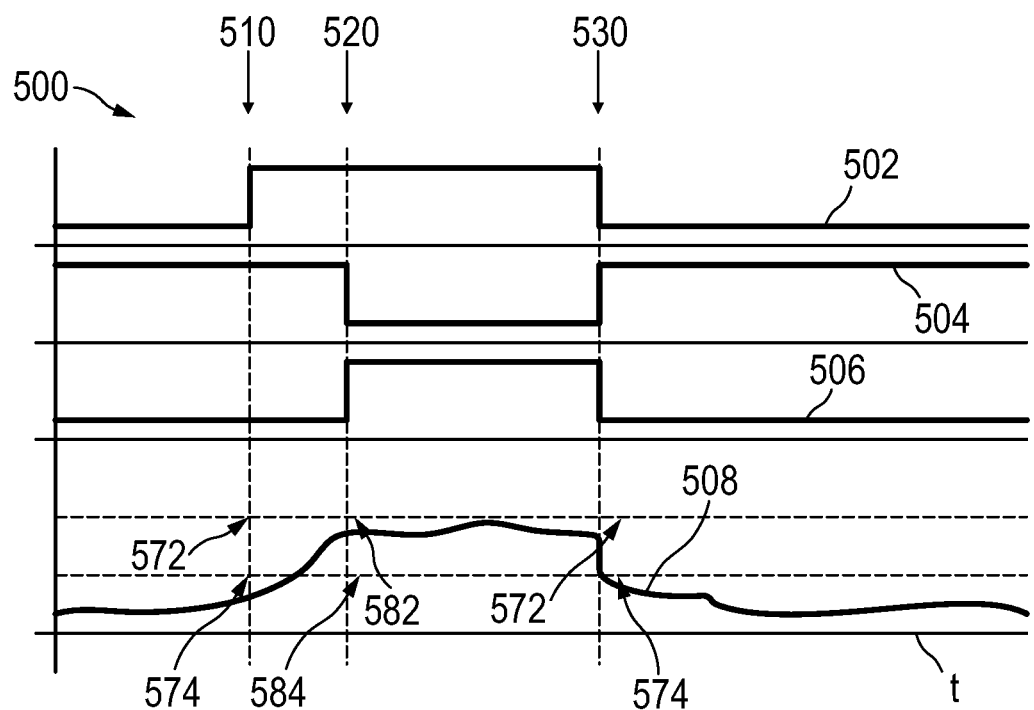
FIG. 5 shows a first operation mode of the RF system.
Figure 6:
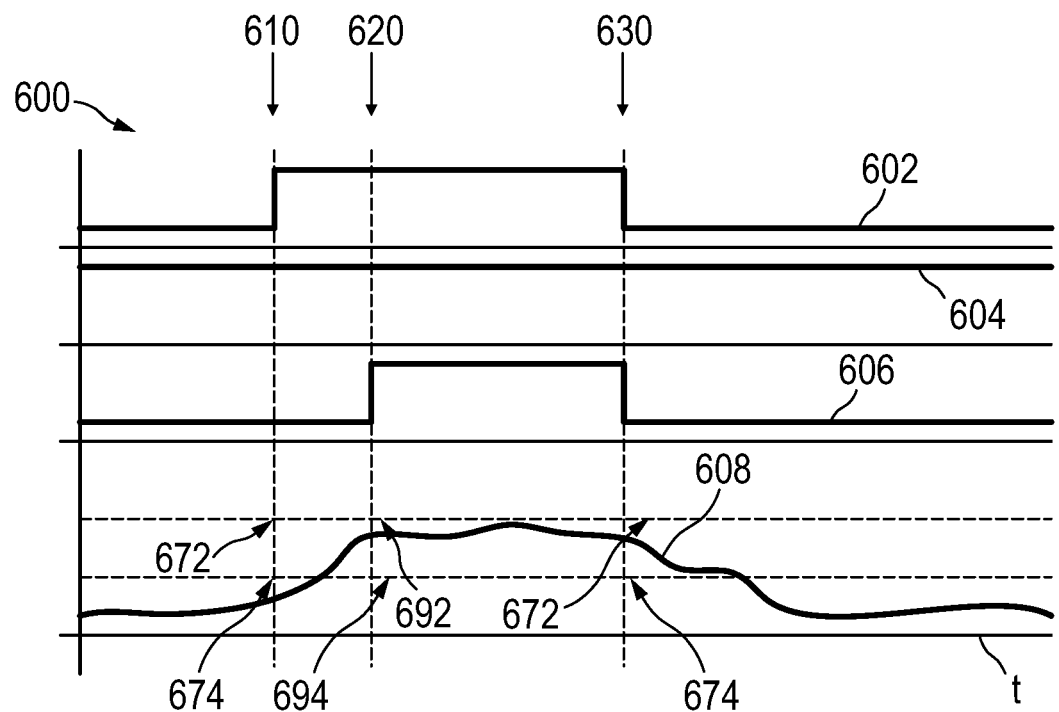
FIG. 6 shows a second operation mode of the RF system.
Figure 7:
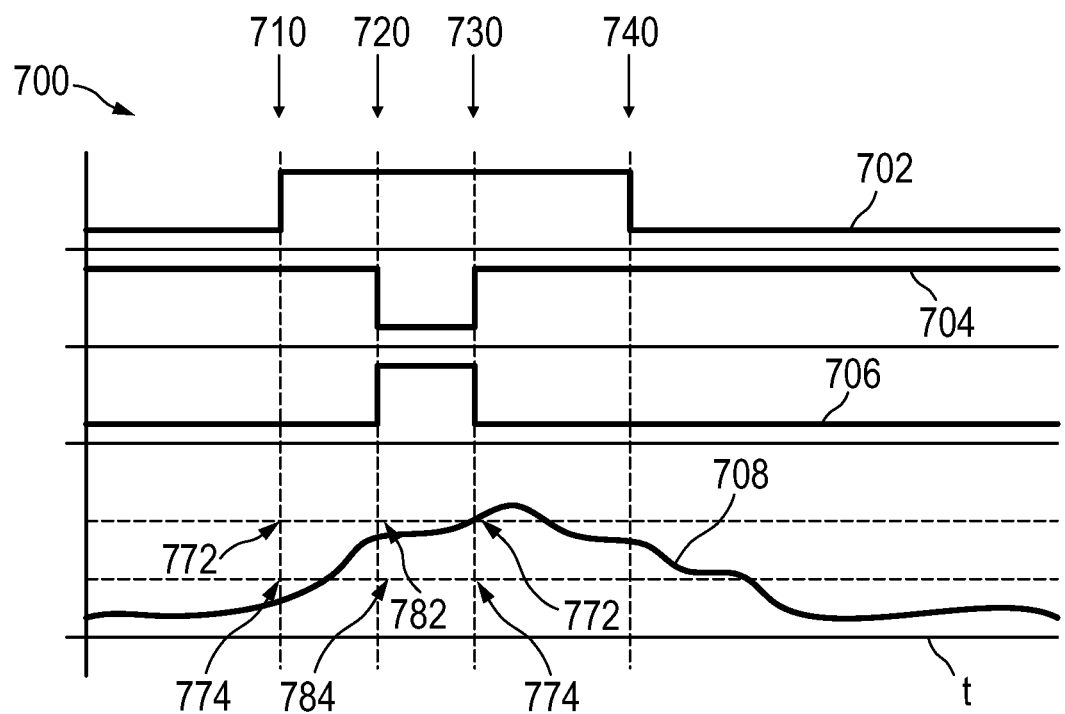
FIG. 7 shows a third operation mode of the RF system.

FIGS. 5 to 7 show three different operation modes of an RF system, e.g., the CL system 100. Line 502, 602, and 702 jump between 0 and 1, i.e., true and false, indicating whether a real event is occurring or not. Lines 504, 604, and 704 jump between 0 and 1, i.e., non-enabled and enabled, indicating whether RF-based sensing is performed by the single-channel communication technology, i.e., at 1, or not, i.e., at 0. Lines 506, 606, and 706 jump between 0 and 1, i.e., non-enabled and enabled, indicating whether RF-based sensing is performed by the multi-channel communication technology, i.e., at 1, or not, i.e., at 0. Lines 508, 608, and 708 indicate a confidence level for detecting the sensing event.

In case of the first operation mode presented in FIG. 5, the confidence level indicated by the line 508 is a single-channel confidence level for the time before time 520 and after time 530, and a multi-channel confidence level between time 520 and time 530.

In case of the second operation mode presented in FIG. 6, the confidence level indicated by the line 608 is a single-channel confidence level for the time before time 620 and after time 630 and a combined confidence level for the time between time 620 and 630. The combined confidence level is a weighted average of the single-channel confidence level and a multi-channel confidence level. In other embodiments, the combined confidence level may depend on the single-channel confidence level and the multi-channel confidence level in another manner.

In case of the third operation mode presented in FIG. 7, the confidence level indicated by the line 708 is a single-channel confidence level for the time before time 720 and after time 730, and a multi-channel confidence level for the time between time 720 and time 730.

In all three operation modes, RF-based sensing is performed by the single-channel communication technology continuously as long as line 508, 608, and 708, respectively, indicating the single-channel confidence level is below the first single-channel threshold 574, 674, and 774, respectively.

At time 510, 610, and 710, respectively, a real event occurs and line 508, 608, and 708, respectively, indicating the single-channel confidence level rises above the first single-channel threshold level 574, 674, and 774, respectively, indicating that a potential sensing event occurred.

In the embodiments of FIGS. 5 to 7, the RF system does not immediately select a multi-channel communication technology for performing RF-based sensing by the multi-channel communication technology after the line 508, 608, and 708, respectively, indicating the single-channel confidence level, rises above the first single-channel threshold level 574, 674, and 774, respectively. This allows the RF system to wait whether line 508, 608, and 708, respectively, rises also above a second single-channel threshold level 572, 672, and 772, respectively, which would indicate that the sensing event is detected.

The RF system, in the embodiments of FIGS. 5 to 7, performs RF-based sensing by the single-channel communication technology until an additional multi-channel communication technology selection condition is fulfilled. In these embodiments, the multi-channel communication technology selection condition is that the single-channel confidence level is above the first single-channel threshold level 574, 674, and 774, respectively, and below a second single-channel threshold level 572, 672, and 772, respectively, for a predetermined time period, i.e., from time 510, 610, and 710, respectively, until time 520, 620, and 720, respectively. In other embodiments, the multi-channel communication technology selection condition may also be that the single-channel confidence level rises less than a predetermined amount for a predetermined time period or any other multi-channel communication technology selection condition.

In FIGS. 5 to 7, the line 508, 608, and 708, respectively, stay below the second single-channel threshold level 572, 672, and 772, respectively, until the predetermined time 520, 620, and 720, respectively. This means a sensing event may be potentially detected, however, the single-channel communication technology is not able to detect the sensing event with certainty. Until time 520, 620, and 720, respectively, the three operation modes are identical. After time 520, 620, and 720, respectively, the three operation modes operate differently as is described in the following.

FIG. 5 shows the first operation mode. In reaction to the rise of the line 508, indicating the single-channel confidence level, above the first single-channel threshold 574 level and below the second single-channel threshold level 572, the RF system performs RF-based sensing by the multi-channel communication technology and stops performing RF-based sensing by the single-channel communication technology at time 520, i.e., indicated by lines 504 and 506 jumping from 1 to 0 and 0 to 1, respectively.

The line 508, after time 520 and before time 530 indicating the multi-channel confidence level, stays between a first multi-channel threshold level 584 and a second multi-channel threshold level 582 until the real event ends, indicated by jumping of line 502 from 1 to 0 at time 530. In the first operation mode, the sensing event is only detected if the single-channel confidence level is above the second single-channel threshold level 572 or the multi-channel confidence level is above the second multi-channel threshold level 582. Therefore, no sensing event is detected. In other embodiments, the sensing event may be detected, for example, if the multi-channel confidence level is above the single-channel confidence level.

The end of the real event at time 530 results in a steep descent of line 508, indicating the multi-channel confidence level, below the first multi-channel threshold level 584 as the received RF signal severely deviates from the expected RF signal for the respective sensing application. In other embodiments, the steep descent of the confidence level may be caused by detecting another sensing event which excludes detecting the sensing event indicated by the confidence level in FIG. 5. The confidence level in FIG. 5 may, for example, relate to detecting a sensing event in form of a gesture command of a user. If another sensing event in form of sleeping of the user is detected, it is excluded that the user provides a gesture command and thus confidence level may descent steeply. In other embodiments, breathing detection, or user activity detection, e.g., gesture detection or head and mouth activity monitoring disclosed in B. Fang, et al. "HeadScan: A Wearable System for Radio-based Sensing of Head and Mouth-Related Activities", published in 2016, 15th ACM/IEEE International Conference on Information Processing in Sensor Networks (IPSN), pages 1-12, https://doi.org/10.1109/IPSN.2016.7460677, may be performed. If it is detected as another sensing event with certainty that there is no heartbeat in the sensing area, also breathing detection or user activity detection is not possible and thus confidence level may descent steeply. In yet other embodiments, user localization within a sensing area may be performed. If it is detected as another sensing event that no user is in the sensing area, e.g., by occupancy detection, it is also excluded to localize the user in the sensing area. In yet another embodiment, sleep monitoring of a user may be performed by measuring the users breathing rate while the user is laying in his bed. If it is detected as another sensing event with certainty that the user walks around the room measuring the breathing rate of the user while laying in his bed may be excluded.

When line 508, indicating the multi-channel confidence level, falls below the first multi-channel threshold level 584 at time 530, RF-based sensing is performed by the single-channel communication technology again and RF-based sensing performed by the multi-channel communication technology is stopped. This is indicated by lines 506 and 504 jumping from 1 to 0 and 0 to 1, respectively.

While the RF system performs RF-based sensing by the multi-channel communication technology, the single-channel communication technology may be used for other tasks, e.g., in order to maintain a connectivity infrastructure among the RF devices, such as basic Zigbee meshing or in order to exchange data, e.g., RF devices serving as WiFi range extenders, or the like.

Optionally, a subset of the RF devices that perform RF-based sensing by the single-channel communication technology may perform RF-based sensing by the multi-channel communication technology while the other RF devices previously performing RF-based sensing may keep operating by the single-channel communication technology in order to ensure a sufficiently strong network canopy for regular data-backhaul backbone. The RF devices may also alternate in their tasks so that during a first time period a first subset of the RF devices performs RF-based sensing by the multi-channel communication technology, while another subset of RF devices operates by the single-channel communication technology in order to ensure the sufficiently strong network canopy for the regular data-backhaul backbone, and so that during a second time period the two subsets of RF devices switch their tasks.

FIG. 6 shows the second operation mode. In reaction to the rise of the line 608, indicating the single-channel confidence level, above the first single-channel threshold level 674 and below the second single-channel threshold level 672 at time 620, the RF system starts performing RF-based sensing by the multi-channel communication technology, i.e., indicated by line 606 jumping from 0 to 1, in parallel to performing RF-based sensing by the single-channel communication technology.

The line 608, after time 620 and before time 630 indicating the combined confidence level, stays between a first combined threshold level 694 and a second combined threshold level 692 until the real event ends, indicated by jumping of line 602 from 1 to 0 at time 630. In the second operation mode, the sensing event is only detected if the single-channel confidence level is above the second single-channel threshold level 672 or the combined confidence level is above the second combined threshold level 692. Therefore, no sensing event is detected.

When line 608, indicating the combined confidence level, falls for a certain amount in a certain time period, indicating an end of the sensing event at time 630, RF-based sensing performed by the multi-channel communication technology is stopped and RF-based sensing is again only performed by the single-channel communication technology. This is indicated by line 606 jumping from 1 to 0. In other embodiments, the end of the real event may also cause a steeper descent of the confidence level.

Performing RF-based sensing in parallel by both communication technologies may ensure some continuity to detecting the sensing event, e.g., not having sensing data gaps or ensuring that a single-channel communication technology baseline is kept up to date. In this case, both communication technologies may be aligned to share airtime such that RF-based sensing may be performed in an alternating fashion. Alternatively, the RF-based sensing by the single-channel communication technology may be performed continuously with different settings when RF-based sensing is performed by the multi-channel communication technology in parallel. RF-based sensing by both communication technologies may also be performed in parallel, for example, with settings of communication technology parameters that optimize their parallel operation, e.g., minimizing wireless interference by performing the RF-based sensing with non-overlapping frequencies of the single-channel communication technology and the multi-channel communication technology.

For example, if both communication technologies detect the same sensing event, e.g., based on fingerprints of the detected distortions, timing behavior, or the like, this validates that the detected sensing event that has occurred is real. The RF system may then react to detecting the sensing event. The confidence in the detection may be increased by the fact that the multi-channel communication technology, e.g., performing frequency hopping, is significantly more robust than the single-channel communication technology against interference. This renders it unlikely that both communication technologies detect the same false sensing event caused by noise.

Concurrently combining two different communication technologies for performing RF-based sensing operating in different frequency ranges has various advantages. For instance, a Zigbee communication technology, e.g., a single-channel communication technology, may be able to recognize a hand being raided up, while for orchestrated WiFi multi-channel sensing, such as 60 GHz WiFi, such as, IEEE 802.11ad, e.g., a multi-channel communication technology, the movement of the individual fingers influence the RF sensing signal. By combining information from Zigbee communication technology that a hand is moving with information from orchestrated WiFi multi-channel sensing about how many fingers are moving, an overall gesture may be reconstructed with increased confidence.

FIG. 7 shows the third operation mode. In reaction to the rise of the line 708, indicating the single-channel confidence level, above the first single-channel threshold level 774 and below the second single-channel threshold level 772 at time 720, the RF system starts performing RF-based sensing by the multi-channel communication technology and stops performing RF-based sensing by the single-channel communication technology, i.e., indicated by lines 704 and 706 jumping from 1 to 0 and 0 to 1, respectively.

The line 708, after time 720 and before time 730 indicating the multi-channel confidence level, rises above the first multi-channel threshold level 784 and also above the second multi-channel threshold level 782 at time 730, indicating detection of the sensing event at time 730.

Upon detection of the sensing event at time 730, in the third operation mode, RF-based sensing performed by the multi-channel communication technology is stopped and RF-based sensing is again performed by the single-channel communication technology. This is indicated by lines 704 and 706 jumping from 0 to 1 and 1 to 0, respectively. Line 708, indicating the single-channel confidence level, after time 730 rises also above the second single-channel threshold level 772 before declining again. The real event ends at time 740 indicated by line 702 jumping from 1 to 0 resulting in a further decline of line 708 indicating the single-channel confidence level.

In other embodiments, performing RF-based sensing by the multi-channel communication technology may be stopped and performing RF-based sensing by the single-channel communication technology may be started once a certain confidence level is reached or a specific feature or specific characteristic of the sensing event is extracted. This allows performing RF-based sensing by different communication technologies dependent on the confidence level, e.g., based on relative achievements or completions which each of the analysis algorithms of the different communication technologies achieved and independent of time or networking reasons.

Figure 8:
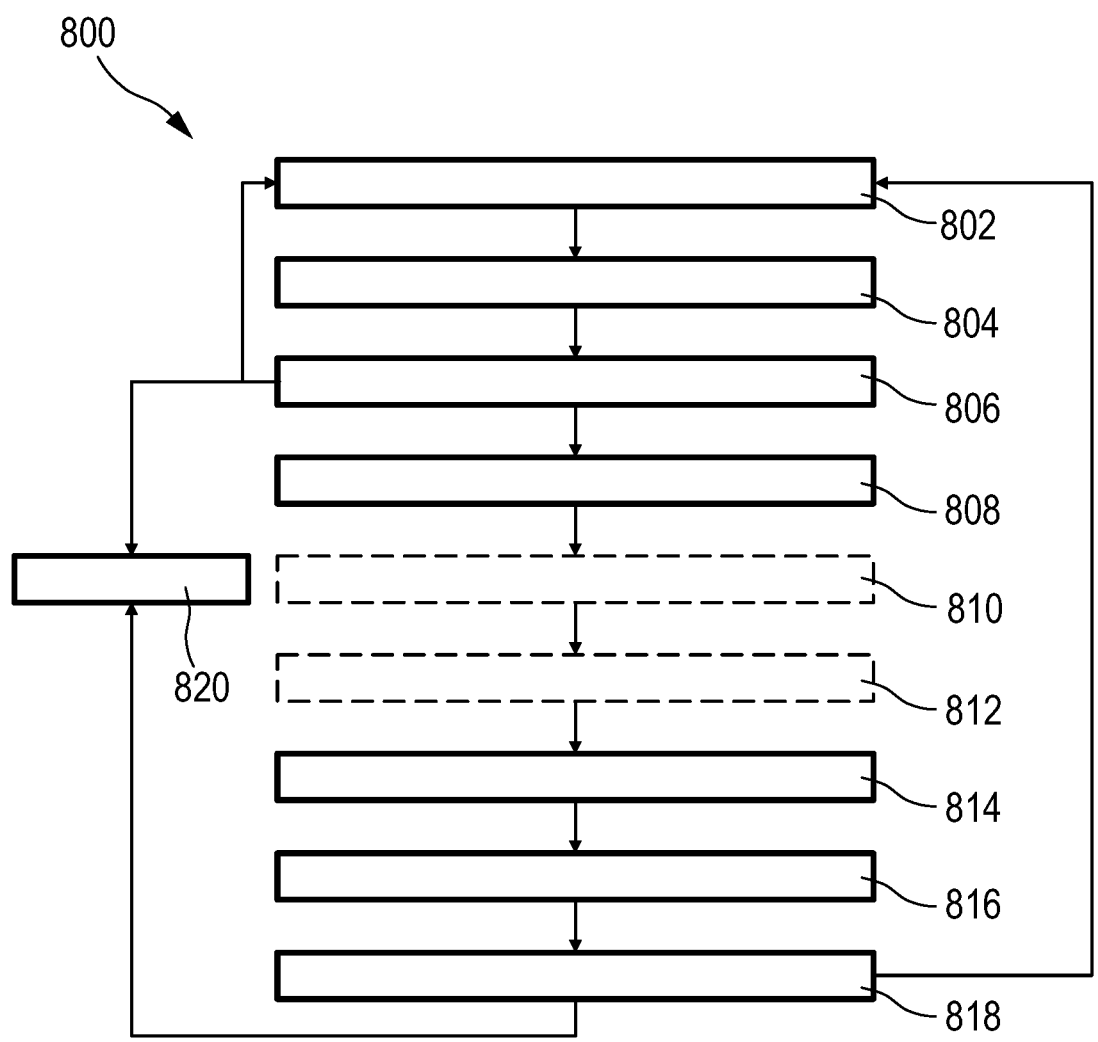
FIG. 8 shows an embodiment of the method for performing RF-based sensing based on multiple communication technologies.

FIG. 8 shows an embodiment of the method 800 for performing RF-based sensing based on multiple communication technologies.

In step 802, RF-based sensing is performed by a single-channel communication technology in order to detect sensing events using one or more RF devices of multiple RF devices of a RF system. In this embodiment, the RF system is a CL system including multiple RF devices in form of luminaires arranged in a room of a building and all RF devices of the RF system perform RF-based sensing by the single-channel communication technology.

In step 804, a single-channel confidence level for detecting a sensing event by performing RF-based sensing by the single-channel communication technology is determined. Steps 802 and 804 can be performed continuously in parallel.

In step 806, it is checked whether the single-channel confidence level is below a first single-channel threshold level, whether the single-channel confidence level is above a second single-channel threshold level, or whether the single-channel confidence level is above the first single-channel threshold level and below the second single-channel threshold level. The second single-channel threshold level is higher than the first single-channel threshold level. In this embodiment, the first single-channel threshold level is at 30% and the second single-channel threshold level is at 70%, corresponding to a confidence level that the sensing event is detected.

As long as the single-channel confidence level is below the first single-channel threshold level, steps 802 and 804 are continuously performed.

If the single-channel confidence level is above the second single-channel threshold level, the sensing event is defined to be detected and step 820 is performed. In step 820 an action is performed in reaction to the detected sensing event, e.g., if the sensing event is occupancy detection, luminaires are activated to provide lighting in the room.

Upon detecting that the single-channel confidence level is above the first single-channel threshold level and below the second single-channel threshold level, step 808 is performed.

In step 808, a multi-channel communication technology for performing RF-based sensing is selected based on one or more radio frequency system criteria.

In optional step 810, additionally a subset of RF devices of the multiple RF devices is selected for performing RF-based sensing by the multi-channel communication technology based on the one or more radio frequency system criteria.

In optional step 812, RF-based sensing performed by RF devices that are not included in the subset of the RF devices is stopped. Step 808 and optional steps 810 and 812 may be performed in parallel or in reversed order.

In step 814, RF-based sensing by the multi-channel communication technology is performed by all RF devices or optionally using the subset of the RF devices, if a subset has been selected.

In step 816, a multi-channel confidence level for detecting the sensing event by performing RF-based sensing by the multi-channel communication technology is determined.

In step 818, it is checked whether the multi-channel confidence level is below a first multi-channel threshold level, whether the multi-channel confidence level is above a second multi-channel threshold level, or whether the multi-channel confidence level is above the first multi-channel threshold level and below the second multi-channel threshold level.

If the multi-channel confidence level is below the first multi-channel threshold level, it is indicated that there is no sensing event to be detected and step 802 and 804 are performed.

As long as the multi-channel confidence level is above the first multi-channel threshold level and below the second multi-channel threshold level, steps 814 and 816 are performed continuously in this embodiment. In other embodiments, performing RF-based sensing by the multi-channel communication technology may be stopped by a stopping event, e.g., after a predetermined duration or when the multi-channel confidence level decreased by a certain percentage or amount during a certain time period.

If the multi-channel confidence level is above the second multi-channel threshold level, the sensing event is defined to be detected. Upon detecting the sensing event, step 820 is performed.

In other embodiments, the sensing event may also be defined to be detected if the multi-channel confidence level is above the single-channel confidence level. The sensing event may also be defined to be detected if a combined confidence level is above a combined threshold level. The combined confidence level may depend on the single-channel confidence level and the multi-channel confidence level. The combined threshold level may depend on the single-channel confidence level, the multi-channel confidence level, the single-channel threshold levels, and/or the multi-channel threshold levels.

In step 820, an action is performed in reaction to the detected event.

In other embodiments, RF-based sensing may be performed by the single-channel communication technology using the subset of the RF devices upon detecting the sensing event. RF-based sensing by the single-channel communication technology using the subset of the RF devices may also be performed after a predetermined duration has passed since detecting that the single-channel confidence level is above the first single-channel threshold level and below the second single-channel threshold level. RF-based sensing by the multi-channel communication technology may be stopped in this case. RF-based sensing by the single-channel communication technology using the subset of the RF devices may also be performed upon detecting an end of the sensing event, e.g., when the sensing event is not detected anymore, for example, after a user left the room in case of occupancy detection.

In other embodiments, upon detecting the sensing event, one or more RF devices of the subset of the RF devices may be selected for performing RF-based sensing by the single-channel communication technology based on the multi-channel confidence level. RF-based sensing by the single-channel communication technology may then be performed using the selected one or more RF devices of the subset of the RF devices. This allows reducing energy consumption in case that a smaller number of RF devices performing RF-based sensing by the multi-channel communication technology is sufficient for detecting the sensing event.

In yet another embodiment, upon detecting the sensing event, an additional subset of the RF devices of the multiple RF devices may be selected for performing RF-based sensing by the multi-channel communication technology based on results of the sensing event. The results of the sensing event may include, for example, the confidence in the detection of the sensing event, e.g., the single-channel confidence level, the multi-channel confidence level, and/or the combined confidence level. The RF-based sensing may then be performed by the multi-channel communication technology using the additional subset of the RF devices. This may improve confidence of the detection, e.g., in case that the confidence of the detection of the sensing event is sufficient, but not very high.

In other embodiments, data obtained by performing RF-based sensing by the multi-channel communication technology may be combined with data obtained by performing RF-based sensing by the single-channel communication technology in order to improve the RF-based sensing. In one embodiment, for example, the data obtained by performing RF-based sensing by the multi-channel communication technology may be used to train an analysis algorithm for performing RF-based sensing by the single-channel communication technology in order to improve the RF-based sensing.

While the invention has been illustrated and described in detail in the drawings and foregoing description, such illustration and description are to be considered illustrative or exemplary and not restrictive; the invention is not limited to the disclosed embodiments. The invention may be used with various other communication technologies, e.g., including Zigbee, BLE, WiFi, cellular, Thread, or any other communication technology. For example, it is possible to operate the invention in an embodiment wherein BLE is used as an aid during WiFi commissioning, wherein BLE is used for direct control via smartphones or for asset tracking or wayfinding. Also, for example, cellular and Zigbee communication technologies may be embedded in an outdoor application used in parking lots and streetlighting. Further applications include using the RF system in buildings, like homes or offices, e.g., using Zigbee and BLE or Wifi and BLE.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like performing RF-based sensing by a single-channel communication technology in order to detect sensing events using one or more RF devices of multiple RF devices of an RF system, determining a single-channel confidence level for detecting a sensing event by performing RF-based sensing by the single-channel communication technology, detecting whether the single-channel confidence level is above a first single-channel threshold level and below a second single-channel threshold level which is higher than the first single-channel threshold level, selecting a multi-channel communication technology for performing RF-based sensing based on one or more RF system criteria, performing RF-based sensing by the multi-channel communication technology, et cetera performed by one or several units or RF devices can be performed by any other number of units or RF devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to radio frequency based sensing based on multiple communication technologies. Radio frequency based sensing is performed by a single-channel communication technology in order to detect sensing events. A single-channel confidence level for detecting a sensing event by performing radio frequency based sensing by the single-channel communication technology is determined. Upon detecting that the single-channel confidence level is above a first single-channel threshold level and below a second single-channel threshold level which is higher than the first single-channel threshold level, a multi-channel communication technology for performing radio frequency based sensing is selected based on one or more radio frequency system criteria, and radio frequency based sensing is performed by the multi-channel communication technology.

The invention claimed is:

1. A radio frequency system for performing radio frequency based sensing based on multiple communication technologies, the radio frequency system comprising multiple radio frequency devices each configured, in order to detect sensing events, for performing radio frequency based sensing by transmitting and receiving radio frequency signals using a single-channel communication technology and further configured for performing radio frequency based sensing by transmitting and receiving radio frequency signals using a multi-channel communication technology, wherein the radio frequency system is configured for determining a single-channel confidence level for detecting a sensing event by performing radio frequency based sensing using the single-channel communication technology, and wherein the radio frequency system is configured upon detecting that the single-channel confidence level is above a first single-channel threshold level and below a second single-channel threshold level which is higher than the first single-channel threshold level:

to select a multi-channel communication technology for performing radio frequency based sensing based on one or more radio frequency system criteria, and to perform radio frequency based sensing by transmitting and receiving RF signals using the multi-channel communication technology.

2. The radio frequency system according to claim 1, wherein the radio frequency system is configured to additionally select a subset of radio frequency devices of the multiple radio frequency devices for performing radio frequency based sensing based on the one or more radio frequency system criteria upon detecting that the single-channel confidence level is above the first single-channel threshold level and below the second single-channel threshold level, and to perform the radio frequency based sensing by the multi-channel communication technology using the subset of radio frequency devices.

3. The radio frequency system according to claim 2, wherein the radio frequency system is configured for stopping radio frequency based sensing performed by radio frequency devices that are not included in the subset of the radio frequency devices upon detecting that the single-channel confidence level is above the first single-channel threshold level and below the second single-channel threshold level.

4. The radio frequency system according to claim 2, wherein the radio frequency system is configured for performing radio frequency based sensing by the single-channel communication technology using the subset of the radio frequency devices upon detecting the sensing event, or after a predetermined duration has passed since detecting that the single-channel confidence level is above the first single-channel threshold level and below the second single-channel threshold level, or upon detecting an end of the sensing event.

5. The radio frequency system according to claim 1, wherein the radio frequency system is configured for determining a multi-channel confidence level for detecting the sensing event by performing radio frequency based sensing by the multi-channel communication technology and
wherein the radio frequency system is configured for defining that the sensing event is detected
if the multi-channel confidence level is above the single-channel confidence level, or
if the multi-channel confidence level is above a multi-channel threshold level, or
if a combined confidence level is above a combined threshold level, wherein the combined confidence level and/or the combined threshold level depend on the single-channel confidence level and the multi-channel confidence level.

6. The radio frequency system according to claim 2, wherein the radio frequency system is configured upon detecting the sensing event
to select one or more radio frequency devices of the subset of the radio frequency devices for performing radio frequency based sensing by the single-channel communication technology based on the multi-channel confidence level and to perform radio frequency based sensing by the single-channel communication technology using the selected one or more radio frequency devices of the subset of the radio frequency devices, or
to select an additional subset of the radio frequency devices of the multiple radio frequency devices for performing radio frequency based sensing by the multi-channel communication technology based on results of the sensing event, and to perform radio frequency based sensing by the multi-channel communication technology using the additional subset of the radio frequency devices.

7. The radio frequency system according to claim 1, wherein the radio frequency system is configured for defining that the sensing event is detected if the single-channel confidence level is above the second single-channel threshold level, and/or
wherein the radio frequency system is configured to continue performing radio frequency based sensing by the single-channel communication technology if the single-channel confidence level is below the first single-channel threshold level.

8. The radio frequency system according to claim 1, wherein the radio frequency system is configured for combining data obtained by performing radio frequency based sensing by the multi-channel communication technology with data obtained by performing radio frequency based sensing by the single-channel communication technology in order to improve the radio frequency based sensing.

9. The radio frequency system according to claim 8, wherein the radio frequency system is configured for using the data obtained by performing radio frequency based sensing by the multi-channel communication technology to train an analysis algorithm for performing radio frequency based sensing by the single-channel communication technology in order to improve the radio frequency based sensing.

10. The radio frequency system according to claim 1, wherein the radio frequency system criteria include one or more of:
the single-channel communication technology used for performing radio frequency based sensing,
a duration for which the multi-channel communication technology is used for performing radio frequency based sensing after detecting that the single-channel confidence level is above the first single-channel threshold level and below the second single-channel threshold level,
an interleaving capability of the single-channel communication technology with the multi-channel communication technology,
a relative priority of the sensing event,
a desired latency for detecting a sensing event,
types of respective radio frequency devices that perform radio frequency based sensing or a type of a respective radio frequency device of the radio frequency devices that perform radio frequency based sensing,
performance capabilities of the respective radio frequency device or the respective radio frequency devices,
an impact of the respective radio frequency device or impacts of the respective radio frequency devices for performing radio frequency based sensing by the multi-channel communication technology and/or for performing radio frequency based sensing by the single-channel communication technology,
a sensitivity of the respective radio frequency device or the respective radio frequency devices for detecting the sensing event,
a location of the respective radio frequency device or locations of the respective radio frequency devices,
a sensing application,
a current network load of the radio frequency system,
a current network load of the respective radio frequency device or the respective radio frequency devices,
a free data traffic capacity of the radio frequency system, and
a free data traffic capacity of the respective radio frequency device or free data capacities of the respective radio frequency devices.

11. The radio frequency system according to claim 1, wherein the threshold levels depend on one or more contextual parameters including one or more of:
a type of a sensing area in which radio frequency based sensing is performed,
a type or types of the radio frequency devices performing radio frequency based sensing,
capabilities of the radio frequency devices performing radio frequency based sensing,
a number of radio frequency devices performing radio frequency based sensing,
an amount of traffic generated for performing radio frequency based sensing,
a power consumption for performing radio frequency based sensing,
a date,
a sensing application,
a type or types of users in the sensing area,
a number of users in the sensing area,
characteristics of a space in which the radio frequency system is arranged,
a type or types of users in the space,
a number of users in the space,
a type or types of sensing events,
one or more expected sensing events,
cascades of sensing events, and
contextual information from external systems.

12. A method for performing radio frequency based sensing based on multiple communication technologies by a radio frequency system comprising multiple radio frequency devices each configured, in order to detect sensing events, for performing radio frequency based sensing by transmitting and receiving radio frequency signals using a single-channel communication technology and further configured for performing radio frequency based sensing by transmitting and receiving radio frequency signals using a multi-channel communication technology, the method including the steps:
- performing radio frequency based sensing by the single-channel communication technology in order to detect sensing events using one or more radio frequency devices of the multiple radio frequency devices of the radio frequency system,
- determining a single-channel confidence level for detecting a sensing event by performing radio frequency based sensing using the single-channel communication technology, and
- upon detecting that the single-channel confidence level is above a first single-channel threshold level and below a second single-channel threshold level which is higher than the first single-channel threshold level
  - selecting the multi-channel communication technology for performing radio frequency based sensing based on one or more radio frequency system criteria, and
  - performing radio frequency based sensing by transmitting and receiving RF signals using the multi-channel communication technology.

13. The method according to claim 12, wherein the method comprises one or more of the steps:
- upon detecting that the single-channel confidence level is above the first single-channel threshold level and below the second single-channel threshold level, additionally selecting a subset of radio frequency devices of the multiple radio frequency devices for performing radio frequency based sensing based on the one or more radio frequency system criteria,
- performing the radio frequency based sensing by the multi-channel communication technology using the subset of radio frequency devices,
- stopping radio frequency based sensing performed by radio frequency devices that are not included in the subset of the radio frequency devices upon detecting that the single-channel confidence level is above the first single-channel threshold level and below the second single-channel threshold level,
- performing radio frequency based sensing by the single-channel communication technology using the subset of the radio frequency devices upon detecting the sensing event,
- performing radio frequency based sensing by the single-channel communication technology using the subset of the radio frequency devices after a predetermined duration has passed since detecting that the single-channel confidence level is above the first single-channel threshold level and below the second single-channel threshold level,
- performing radio frequency based sensing by the single-channel communication technology using the subset of the radio frequency devices upon detecting an end of the sensing event,
- determining a multi-channel confidence level for detecting the sensing event by performing radio frequency based sensing by the multi-channel communication technology,
- defining that the sensing event is detected if the multi-channel confidence level is above the single-channel confidence level,
- defining that the sensing event is detected if the multi-channel confidence level is above a multi-channel threshold level,
- defining that the sensing event is detected if a combined confidence level is above a combined threshold level, wherein the combined confidence level and/or the combined threshold level depend on the single-channel confidence level and the multi-channel confidence level,
- upon detecting the sensing event, selecting one or more radio frequency devices of the subset of the radio frequency devices for performing radio frequency based sensing by the single-channel communication technology based on the multi-channel confidence level and performing radio frequency based sensing by the single-channel communication technology using the selected one or more radio frequency devices of the subset of the radio frequency devices,
- upon detecting the sensing event, selecting an additional subset of the radio frequency devices of the multiple radio frequency devices for performing radio frequency based sensing by the multi-channel communication technology based on results of the sensing event, and performing radio frequency based sensing by the multi-channel communication technology using the additional subset of the radio frequency devices,
- defining that the sensing event is detected if the single-channel confidence level is above the second single-channel threshold level,
- continuing to perform radio frequency based sensing by the single-channel communication technology if the single-channel confidence level is below the first single-channel threshold level,
- combining data obtained by performing radio frequency based sensing by the multi-channel communication technology with data obtained by performing radio frequency based sensing by the single-channel communication technology in order to improve the radio frequency based sensing, and
  - using the data obtained by performing radio frequency based sensing by the multi-channel communication technology to train an analysis algorithm for performing radio frequency based sensing by the single-channel communication technology in order to improve the radio frequency based sensing.

14. A non-transitory computer readable medium comprising computer executable instructions that, when executed by a processor, perform at least the method as defined in claim 12.

* * * * *